United States Patent
French

(10) Patent No.: US 11,410,620 B2
(45) Date of Patent: Aug. 9, 2022

(54) ADAPTIVE GATE DRIVING FOR HIGH FREQUENCY AC DRIVING OF EWOD ARRAYS

(71) Applicant: Nuclera Nucleics Ltd., Cambridge (GB)

(72) Inventor: Ian French, Hsinchu (TW)

(73) Assignee: Nuclera Nucleics Ltd., Cambridge (GB)

( * ) Notice: Subject to any disclaimer, the term of this patent is extended or adjusted under 35 U.S.C. 154(b) by 0 days.

(21) Appl. No.: 17/178,282

(22) Filed: Feb. 18, 2021

(65) Prior Publication Data

US 2021/0256919 A1 Aug. 19, 2021

Related U.S. Application Data

(60) Provisional application No. 62/977,924, filed on Feb. 18, 2020.

(51) Int. Cl.
*G09G 3/34* (2006.01)
*G02B 26/00* (2006.01)
*G02B 1/18* (2015.01)

(52) U.S. Cl.
CPC .............. *G09G 3/348* (2013.01); *G02B 1/18* (2015.01); *G02B 26/005* (2013.01);
(Continued)

(58) Field of Classification Search
CPC .......... G09G 3/348; G09G 2310/0275; G09G 2310/08; G02B 1/18; G02B 26/005; G02B 2207/115
See application file for complete search history.

(56) References Cited

U.S. PATENT DOCUMENTS 3,813,519 A 5/1974 Jochin et al.
5,311,337 A 5/1994 McCartney, Jr.
(Continued)

FOREIGN PATENT DOCUMENTS

JP 2013076739 A 4/2013
TW 200916823 A 4/2009
(Continued)

OTHER PUBLICATIONS

Abdelgawad, Mohamed et al., "The Digital Revolution: A New Paradigm for Microfluidics", Advanced Materials, vol. 21, pp. 920-5,(2009). Jan. 1, 2009.
(Continued)

*Primary Examiner* — Carolyn R Edwards
(74) *Attorney, Agent, or Firm* — McCarter & English, LLP; David R. Burns

(57) ABSTRACT

A method of driving an active matrix electrowetting on dielectric device including thin-film-transistors to increase the switching frequency of the propulsion electrodes beyond what is typical for line-by-line active matrix driving. By grouping gate lines and simultaneously driving those gate lines as a gate block, a frame update can be completed much faster and, as a consequence, the overall drive frequency at the propulsion electrodes can be increased substantially. The faster drive frequency improves the performance of electrowetting devices, especially when used with aqueous droplets having a high ionic strength.

19 Claims, 21 Drawing Sheets

(52) U.S. Cl.
CPC ............... *G02B 2207/115* (2013.01); *G09G 2310/0275* (2013.01); *G09G 2310/08* (2013.01)

(56) References Cited

U.S. PATENT DOCUMENTS

| | | | |
|---|---|---|---|
| 5,964,995 | A | 10/1999 | Nikiforov et al. |
| 6,352,758 | B1 | 3/2002 | Huang et al. |
| 6,565,727 | B1 | 5/2003 | Shenderov |
| 6,773,566 | B2 | 8/2004 | Shenderov |
| 6,911,132 | B2 | 6/2005 | Pamula et al. |
| 6,967,489 | B2 | 11/2005 | Brooks et al. |
| 6,977,033 | B2 | 12/2005 | Becker et al. |
| 7,052,244 | B2 | 5/2006 | Fouillet et al. |
| 7,053,009 | B2 | 5/2006 | Conley, Jr. et al. |
| 7,163,612 | B2 | 1/2007 | Sterling et al. |
| 7,215,306 | B2 | 5/2007 | Lo |
| 7,328,979 | B2 | 2/2008 | Decre et al. |
| 7,420,549 | B2 | 9/2008 | Jacobson et al. |
| 7,458,661 | B2 | 12/2008 | Kim et al. |
| 7,504,709 | B2 | 3/2009 | Masuda et al. |
| 7,531,072 | B2 | 5/2009 | Roux et al. |
| 7,547,380 | B2 | 6/2009 | Velev |
| 7,641,779 | B2 | 1/2010 | Becker et al. |
| 7,733,559 | B2 | 6/2010 | Kawase et al. |
| 7,767,069 | B2 | 8/2010 | Lee et al. |
| 7,902,680 | B2 | 3/2011 | Tano et al. |
| 7,976,795 | B2 | 6/2011 | Zhou et al. |
| 8,004,738 | B2 | 8/2011 | Yang et al. |
| 8,093,064 | B2 | 1/2012 | Shah et al. |
| 8,128,798 | B2 | 3/2012 | Adachi et al. |
| 8,159,644 | B2 | 4/2012 | Takatori |
| 8,173,000 | B1 | 5/2012 | Hadwen et al. |
| 8,187,864 | B2 | 5/2012 | Wheeler et al. |
| 8,319,759 | B2 | 11/2012 | Jacobson et al. |
| 8,349,276 | B2 | 1/2013 | Pamula et al. |
| 8,388,909 | B2 | 3/2013 | Pollack et al. |
| 8,409,417 | B2 | 4/2013 | Wu |
| 8,460,528 | B2 | 6/2013 | Pollack et al. |
| 8,514,479 | B2 | 8/2013 | Bae et al. |
| 8,525,966 | B2 | 9/2013 | Takatori |
| 8,529,743 | B2 | 9/2013 | Kim et al. |
| 8,547,111 | B2 | 10/2013 | Hadwen et al. |
| 8,587,513 | B2 | 11/2013 | Ozawa |
| 8,593,438 | B2 | 11/2013 | Komatsu et al. |
| 8,603,413 | B2 | 12/2013 | Fouillet |
| 8,653,832 | B2 | 2/2014 | Hadwen et al. |
| 8,764,958 | B2 | 7/2014 | Wang |
| 8,791,891 | B2 | 7/2014 | Van Dijk et al. |
| 8,810,882 | B2 | 8/2014 | Heikenfeld et al. |
| 8,815,070 | B2 | 8/2014 | Wang et al. |
| 8,834,695 | B2 | 9/2014 | Wang et al. |
| 8,858,772 | B2 | 10/2014 | Crane et al. |
| 8,926,811 | B2 | 1/2015 | Wu |
| 8,936,708 | B2 | 1/2015 | Feiglin et al. |
| 8,940,147 | B1 | 1/2015 | Bartsch et al. |
| 8,958,044 | B2 | 2/2015 | Takatori |
| 8,993,348 | B2 | 3/2015 | Wheeler et al. |
| 8,994,705 | B2 | 3/2015 | Jacobson et al. |
| 9,061,262 | B2 | 6/2015 | Vann et al. |
| 9,216,414 | B2 | 12/2015 | Chu |
| 9,266,076 | B2 | 2/2016 | Kim et al. |
| 9,458,489 | B2 | 10/2016 | Lim et al. |
| 9,458,543 | B2 | 10/2016 | Hadwen |
| 9,459,445 | B1* | 10/2016 | Notermans ............ G02B 26/005 |
| 9,476,811 | B2 | 10/2016 | Mudrik et al. |
| 9,594,056 | B2 | 3/2017 | Fobel et al. |
| 9,610,582 | B2 | 4/2017 | Kapur et al. |
| 9,623,407 | B2 | 4/2017 | Delamarche et al. |
| 9,649,632 | B2 | 5/2017 | Van Dam et al. |
| 9,714,463 | B2 | 7/2017 | White et al. |
| 9,815,056 | B2 | 11/2017 | Wu et al. |
| 9,915,631 | B2 | 3/2018 | Hoffmeyer et al. |
| 9,983,169 | B2 | 5/2018 | Bramanti |
| 10,018,828 | B2 | 7/2018 | Massard |
| 10,486,156 | B2 | 11/2019 | Campbell et al. |
| 10,543,466 | B2 | 1/2020 | Wu |
| 10,646,454 | B2 | 5/2020 | Liu et al. |
| 10,882,042 | B2 | 1/2021 | French |
| 2006/0039823 | A1 | 2/2006 | Yamakawa et al. |
| 2007/0023292 | A1 | 2/2007 | Kim et al. |
| 2008/0124252 | A1 | 5/2008 | Marchand et al. |
| 2010/0032293 | A1 | 2/2010 | Pollack et al. |
| 2010/0225611 | A1 | 9/2010 | Lee et al. |
| 2011/0090451 | A1 | 4/2011 | Chang et al. |
| 2012/0083046 | A1* | 4/2012 | Watson ............ B01L 3/502715 239/3 |
| 2012/0106238 | A1* | 5/2012 | John ................ B01L 3/50273 365/189.16 |
| 2012/0273702 | A1 | 11/2012 | Culbertson et al. |
| 2013/0100012 | A1* | 4/2013 | Todorovich ........ G09G 3/3466 345/156 |
| 2013/0161193 | A1 | 6/2013 | Jacobs et al. |
| 2013/0271153 | A1 | 10/2013 | Hadwen |
| 2015/0377831 | A1 | 12/2015 | Wheeler et al. |
| 2016/0199832 | A1 | 7/2016 | Jamshidi et al. |
| 2016/0312165 | A1 | 10/2016 | Lowe, Jr. et al. |
| 2017/0154583 | A1* | 6/2017 | de Greef ................ G09G 3/34 |
| 2017/0315090 | A1 | 11/2017 | Wheeler et al. |
| 2018/0101359 | A1* | 4/2018 | Harada ............... H01L 29/7869 |
| 2019/0210026 | A1 | 7/2019 | Jebrail et al. |
| 2020/0064705 | A1 | 2/2020 | Kayal et al. |
| 2020/0089035 | A1 | 3/2020 | Tsai et al. |
| 2020/0114135 | A1 | 4/2020 | Paolini, Jr. et al. |
| 2020/0347840 | A1 | 11/2020 | Paolini, Jr. et al. |
| 2020/0348576 | A1 | 11/2020 | Visani et al. |

FOREIGN PATENT DOCUMENTS

| | | |
|---|---|---|
| WO | 2001/17029 A1 | 3/2001 |
| WO | 2007120241 A2 | 10/2007 |
| WO | 2017075295 A1 | 5/2017 |

OTHER PUBLICATIONS

Choi, Kihwan et al., "Digital Microfluidics", Annu. Rev. Anal. Chem. 5:413-40 (2012). Apr. 9, 2012.

Qi, Lin et al., "Mechanical-activated digital microfluidics with gradient surface wettability", Lab Chip, vol. 19, pp. 223-232, (2019). Dec. 4, 2019.

Subramanian, R. Shankar et al., "Motion of a Drop on a Solid Surface Due to a Wettability Gradient", Lanqmuir, vol. 12, pp. 11844-11849, (2005). Nov. 4, 2005.

Yu, Xi et al., "Surface Gradient Material: From Superhydrophobicity to Superhydrophilicity", Langmuir, vol. 22, pp.4483-6, (2006). Apr. 7, 2006.

Ito, Yoshihiro et al., "The Movement of a Water Droplet on a Gradient Surface Prepared by Photodegradation", Langmuir, vol. 23, pp. 1845-1850, (2007). Dec. 22, 2006.

Bhattacharjee, Biddut, "Study of Droplet Splitting in an Electrowetting Based Digital Microfluidic System", The University of British Columbia, Sep. 2012. Sep. 1, 2012.

Cho, Sung Kwon et al., "Creating, Transporting, Cutting, and Merging Liquid Droplets by Electrowetting-Based Actuation for Digital Microfluidic Circuits", Journal of Microelectromechanical Systems, vol. 12, No. 1, Feb. 2003. Feb. 1, 2003.

Nikapitiya, N. Y. Jagath B.et al., "Accurate, consistent, and fast droplet splitting and dispensing in electrowetting on dielectric digital microfluidics", Mirco and Nano Systems Letters, vol. 5, No. 24, Jun. 2017. Jun. 16, 2017.

Hadwen, B. et al., "Programmable large area digital microfluidic array with integrated droplet sensing for bioassays", Lab on a Chip, Issue 18, (2012). May 22, 2012.

Cooney, Christopher G. et al., "Electrowetting droplet microfluidics on a single planar surface", Microfluisics and Nanofluidics, vol. 2, Issue 5, pp. 435-446 (Sep. 2006). Sep. 1, 2006.

Fouillet, Y. et al., "EWOD Digital Microfluidics for Lab on a Chip", International Conference on Nanochannels, Microchannels, and Minichannels, Paper No. ICNMM2006-96020, pp. 1255-1264, (Sep. 2008). Sep. 15, 2008.

(56) References Cited

OTHER PUBLICATIONS

Nemani, Srinivasa Kartik et al., "Surface Modification of Polymers: Methods and Applications", Advanced Materials Interfaces, vol. 5, Issue 24, p. 1801247, Dec. 21, 2018. Dec. 21, 2018.

Hitzbleck, Martina et al., "Reagents in microfluidics: an 'in' and 'out' challenge", Chem. Soc. Rev., vol. 42, p. 8494, (2013). Mar. 27, 2013.

Walker, Shawn W. et al., "Modeling the Fluid Dynamics of Electro-Wetting on Dielectric (EWOD)", Journal of Microelectromechanical Systems, vol. 15, No. 4, pp. 986-1000, (Aug. 2006). Aug. 2006.

Li, Yiyan et al., "Improving the performance of electrowetting on dielectric microfluidics using piezoelectric top plate control", Sensors and Actuators B, vol. 229, pp. 63-74 (2016). 2016.

Barbulovic-Nad, Irena et al., "Digital microfluidics for cell-based assays", Lab Chip, vol. 8, pp. 519-526 (2008). Feb. 25, 2008.

Newman, Sharon et al., "High density DNA storage library via dehydration with digital microfluidic retrieval", Nature Communications, vol. 10, No. 1706 (2019). Apr. 12, 2019.

Dhindsa, Manjeet et al., "Virtual electrowetting channels: electronic liquid transport with continuous channel functionality", Lab on a Chip, Issue 7, pp. 832-836, (2010). Feb. 26, 2010.

Dhindsa et al., Electrowetting without Electrolysis on Self-Healing Dialectrics. Langmuir. 2011;27:5665-5670.

Dhindsa et al., Virtual electrowetting channels: electronic liquid transport with continuous channel functionality. Lab Chip. 2010;10:832-836.

International Search Report and Written Opinion for Application No. PCT/US2021/018602, dated Jun. 8, 2021, 6 pages.

\* cited by examiner

Three droplets injected
7 contiguous gate blocks
3 non-contiguous gate blocks

Three droplets moving
7 contiguous gate blocks
3 non-contiguous gate blocks

Three droplets moving
7 contiguous gate blocks
3 non-contiguous gate blocks

Three droplets moving, three new droplets being injected
7 contiguous gate blocks
3 non-contiguous gate blocks Six droplets moving
7 contiguous gate blocks
3 non-contiguous gate blocks Six droplets moving, two new droplets being injected
7 contiguous gate blocks
3 non-contiguous gate blocks Seven droplets moving, one held in position
7 contiguous gate blocks
3 non-contiguous gate blocks Seven droplets moving, one held in position
7 contiguous gate blocks
3 non-contiguous gate blocks Six droplets moving, three new droplets being injected,
two held in position
11 contiguous gate blocks
4 non-contiguous gate blocks Five droplets moving, eight held in position
11 contiguous gate blocks
4 non-contiguous gate blocks Four droplets moving, two new droplets being injected,
six held in position, three changing shape
9 contiguous gate blocks
4 non-contiguous gate blocks Six droplets moving, six daughter droplets separating,
three mother droplets re-sizing, six held in position
15 contiguous gate blocks
5 non-contiguous gate blocks Six droplets moving, three held in position
15 contiguous gate blocks
5 non-contiguous gate blocks Six droplets moving, six droplets merging,
three re-sizing, six held in position
15 contiguous gate blocks
6 non-contiguous gate blocks Six droplets moving, fifteen held in position
15 contiguous gate blocks
5 non-contiguous gate blocks Six droplets merging, three droplets re-shaping,
six held in position
11 contiguous gate blocks
4 non-contiguous gate blocks

ADAPTIVE GATE DRIVING FOR HIGH FREQUENCY AC DRIVING OF EWOD ARRAYS

RELATED APPLICATIONS

This application claims priority to U.S. Provisional Patent Application No. 62/977,924, filed Feb. 18, 2020. All patents, applications, and publications disclosed herein are incorporated by reference in their entireties.

BACKGROUND

Digital microfluidic (DMF) devices use independent electrodes to propel, split, and join droplets in a confined environment, thereby providing a "lab-on-a-chip." Digital microfluidic devices have been used to actuate a wide range of volumes (nL to µL) and are alternatively referred to as electrowetting on dielectric, or "EWoD," to further differentiate the method from competing microfluidic systems that rely on electrophoretic flow and/or micropumps. In electrowetting, a continuous or pulsed electrical signal is applied to a droplet, leading to switching of its contact angle. Liquids capable of electrowetting a hydrophobic surface typically include a polar solvent, such as water or an ionic liquid, and often feature ionic species, as is the case for aqueous solutions of electrolytes. A 2012 review of the electrowetting technology was provided by Wheeler in "Digital Microfluidics," *Annu. Rev. Anal. Chem.* 2012, 5:413-40. The technique allows sample preparation, assays, and synthetic chemistry to be performed with tiny quantities of both samples and reagents. In recent years, controlled droplet manipulation in microfluidic cells using electrowetting has become commercially viable, and there are now products available from large life science companies, such as Oxford Nanopore.

Typically, EWoD devices include a stack of an electrode, an insulating dielectric layer, and a hydrophobic layer providing a working surface. A droplet is placed on the working surface, and the electrode, once actuated, can cause the droplet to deform and wet or de-wet from the surface depending on the applied voltage. Most of the literature reports on EWoD involve so-called "direct drive" devices (a.k.a. "segmented" devices), whereby ten to several hundred electrodes are directly driven with a controller. While segmented devices are easy to fabricate, the number of electrodes is limited by space and driving constraints. Accordingly, it is not possible to perform massive parallel assays, reactions, etc. in direct drive devices. In comparison, "active matrix" devices (a.k.a. active matrix EWoD, a.k.a. AM-EWoD) devices can have many thousands, hundreds of thousands or even millions of addressable electrodes. In AM-EWoD devices electrodes are typically switched by thin-film transistors (TFTs) and droplet motion is programmable so that AM-EWoD arrays can be used as general purpose devices that allow great freedom for controlling multiple droplets and executing simultaneous analytical processes.

The electrodes of an AM-EWoD are typically switched by thin-film transistors (TFTs), although electro-mechanical switches may also be used. TFT based thin film electronics may be used to control the addressing of voltage pulses to an EWoD array by using circuit arrangements very similar to those employed in AM display technologies. TFT arrays are highly desirable for this application, due to having thousands of addressable pixels, thereby allowing mass parallelization of droplet procedures. Driver circuits can be integrated onto the AM-EWoD array substrate, and TFT-based electronics are well suited to the AM-EWoD application. TFTs can be made using a wide variety of semiconductor materials. A common material is silicon. The characteristics of a silicon-based TFT depend on the silicon's crystalline state, that is, the semiconductor layer can be either amorphous silicon (a-Si), microcrystalline silicon, or it can be annealed into low-temperature polysilicon (LTPS). TFTs based on a-Si are cheap to produce so that relatively large substrate areas can be manufactured at relatively low cost. More exotic materials, such as metal oxides may also be used to fabricate thin film transistor arrays but the fabrication costs of such devices is typically high because of the specialized equipment needed to handle/deposit the metal oxides.

In traditional applications where TFTs are used to switch display pixels, the frame rates are in the order of about 100 Hz. However, when DC or low frequency AC signals are used for EWoD then ions can diffuse through the top dielectric layers. When ions reach the underlying TFT array with metal lines and voltages between them then a range of different detrimental electrochemical reactions will occur. Several different failure mechanisms for a-Si TFT EWoD devices driven at 100 Hz have been seen. It has also reported that EWoD arrays tends to slow down with use for low frequency driving. The mechanism of the slow-down is not understood, but it does not occur with high frequency driving. Hence, AM-EWoD application requires a frame rate that is faster than is used in display applications.

For active matrix devices, the drive signals are often output from a controller to gate and scan drivers that, in turn, provide the required current-voltage inputs to active the various TFT in the active matrix. However, controller-drivers capable of receiving, e.g., image data, and outputting the necessary current-voltage inputs to active the TFTs are commercially available. Most active matrices of thin-film-transistors are drive with line-at-a-time (a.k.a., line-by-line) addressing, which is used in the vast majority of LCD displays. Line-at-a-time addressing is used in all traditional a-Si TFT arrays due to low electron mobility and large TFT size, which means circuits cannot effectively be used in a-Si TFT pixels. Metal oxide and LTPS TFTs have much higher mobility than a-Si TFTs, but even these cannot reach frame rates much above 200 Hz with line-at-a-time addressing due to capacitive loading on gate and source lines.

An alternative method of driving TFT arrays for electrowetting applications is known as memory-in-pixel. This method typically combines high-performance LTPS TFTs memory and drive circuits fabricated onto the backplane. Memory-in-pixel driving uses a first signal to put a pixel into an "ON" state, whereupon a different integrated circuit provides a drive signal directly to the pixel until a separate control signal is received to move the pixel to an "OFF" state, thus disabling the drive signal. The advantage to memory-in-pixel is that voltage pulses do not need to be applied to long gate and source lines several times per second. This results in significant power reduction. In advanced memory-in-pixel technologies, very high quality LTPS TFTs are used to incorporate memory and oscillator circuits at each pixel and allow high frequency (1 kHz) EWoD operation. However, the memory-in-pixel with oscillator technique is very expensive to fabricate because of the many additional masks required and deposition steps required. In addition, because of the extra processing steps, the yield decreases substantially beyond normal "simple" AM-TFT designs with a-Si. Such processes are not suitable for use AM-TFT panels because the lower yield due to the extra steps is further exacerbated by the number of opportunities for failure as the number of pixels grows exponentially with increased diagonal length.

SUMMARY OF INVENTION

In a first aspect, there is provided a method of driving an active matrix electrowetting on dielectric (AM-EWoD) device. The device includes a processing unit, a transistor matrix (each transistor of the matrix being operably connected to a gate line, a data line, and a propulsion electrode), a plurality of gate lines (each gate line being operably connected to a gate driver), a plurality of data lines (each data line being operably connected to a data driver), a controller operably connected to the processing unit, the gate drivers, and the data drivers, and a dielectric layer covering at least a portion of the transistor matrix, at least a portion of the plurality of gate lines, and at least a portion of the plurality of data lines. The method of driving the AM-EWoD device includes receiving input instructions in the processing unit (the input instructions relating to a droplet operation to be performed by the AM-EWoD), calculating a number of gate blocks in the processing unit (at least one gate block including a plurality of gate lines), outputting gate line and data line selecting instructions from the processing unit to the controller, outputting a gate line signal from the controller to the drivers of the at least one gate block, to simultaneously drive the lines of the at least one gate block, and outputting a data line signal from the controller to at least one data line driver, to drive the data line.

In some embodiments of the first aspect, the transistors of the transistor matrix are thin film transistors (TFT). In some embodiments, the transistors of the transistor matrix comprise a layer of amorphous silicon. In some embodiments, the transistors of the transistor matrix comprise a layer of a metal oxide semiconductor. In some embodiments, the transistors of the transistor matrix comprise a layer of low-temperature polycrystalline silicon (LTPS). In some embodiments, the droplet operation comprises a plurality of steps, each step comprising driving at least one gate block and at least one data line. In some embodiments, the transistor matrix is driven at frequency of at least about 200 Hz. In some embodiments, the transistor matrix is driven at frequency of at least about 1 kHz. In some embodiments, the maximum line time (MLT) of each gate line is at least about 10 µs. In some embodiments, the device further comprises a hydrophobic layer covering at least a portion of the dielectric layer.

In a second aspect, there is provided an active matrix electrowetting on dielectric (AM-EWoD) system. The system includes a transistor matrix (each transistor of the matrix being operably connected to a gate line, a data line, and a propulsion electrode), a plurality of gate lines (each gate line being operably connected to a gate driver), a plurality of data lines (each data line being operably connected to a data driver), a controller operably connected to the processing unit, the gate drivers, and the data drivers, a dielectric layer covering at least a portion of the transistor matrix, at least a portion of the plurality of gate lines, and at least a portion of the plurality of data lines, and a processing unit operably programmed to perform an adaptive-gate-driving method, wherein the adaptive-gate-driving method includes receiving input instructions to the processing unit, the input instructions relating to a droplet operation to be performed by the AM-EWoD system, calculating a number of gate blocks for performing the droplet operation, at least one gate block including a plurality of gate lines that will simultaneously receive a same gate line signal, outputting line selecting instructions from the processing unit to the controller, outputting the same gate line signal from the controller to the drivers of the gate block, to simultaneously drive the gate lines of the gate block, and outputting a data line signal from the controller to at least one data line driver, to drive the at least one data line.

In some embodiments of the second aspect, the transistors of the transistor matrix are thin film transistors (TFT). In some embodiments, the transistors of the transistor matrix comprise a layer of amorphous silicon. In some embodiments, the transistors of the transistor matrix comprise a layer of a metal oxide semiconductor. In some embodiments, the transistors of the transistor matrix comprise a layer of low-temperature polycrystalline silicon (LTPS). In some embodiments, the droplet operation comprises a plurality of steps, each step comprising driving at least one gate block and at least one data line. In some embodiments, the transistor matrix is driven at frequency of at least about 200 Hz. In some embodiments, the transistor matrix is driven at frequency of at least about 1 kHz. In some embodiments, the maximum line time (MLT) of each gate line is at least about 10 µs. In some embodiments, the device further comprises a hydrophobic layer covering at least a portion of the dielectric layer.

DEFINITIONS

Figure 1A:
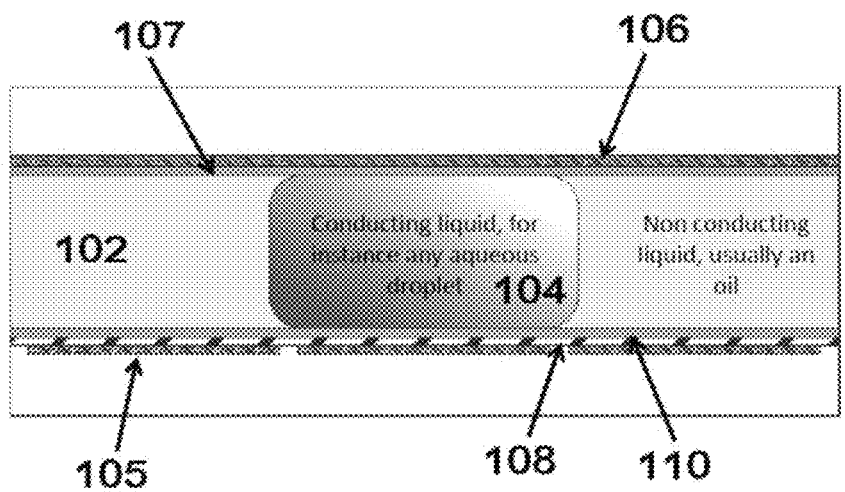
FIG. 1A is a diagrammatic cross-section of the cell of an example EWoD device.

Unless otherwise noted, the following terms have the meanings indicated.

"Actuate" with reference to one or more electrodes means effecting a change in the electrical state of the one or more electrodes which, in the presence of a droplet, results in a manipulation of the droplet.

"Droplet" means a volume of liquid that electrowets a hydrophobic surface and is at least partially bounded by carrier fluid. For example, a droplet may be completely surrounded by carrier fluid or may be bounded by carrier fluid and one or more surfaces of an EWoD device. Droplets may take a wide variety of shapes; non-limiting examples include generally disc shaped, slug shaped, truncated sphere, ellipsoid, spherical, partially compressed sphere, hemispherical, ovoid, cylindrical, and various shapes formed during droplet operations, such as merging or splitting or formed as a result of contact of such shapes with one or more working surface of an EWoD device. Droplets may include typical polar fluids such as water, as is the case for aqueous or non-aqueous compositions, or may be mixtures or emulsions including aqueous and non-aqueous components. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include one or more reagent, such as water, deionized water, saline solutions, acidic solutions, basic solutions, detergent solutions and/or buffers. Other examples of droplet contents include reagents, such as a reagent for a biochemical protocol, a nucleic acid amplification protocol, an affinity-based assay protocol, an enzymatic assay protocol, a gene sequencing protocol, a protein sequencing protocol, and/or a protocol for analyses of biological fluids. Further example of reagents include those used in biochemical synthetic methods, such as a reagent for synthesizing oligonucleotides finding applications in molecular biology and medicine, and/or one or more nucleic acid molecules. The oligonucleotides may contain natural or chemically modified bases and are most commonly used as antisense oligonucleotides, small interfering therapeutic RNAs (siRNA) and their bioactive conjugates, primers for DNA sequencing and amplification, probes for detecting complementary DNA or RNA via molecular hybridization, tools for the targeted introduction of mutations and restriction sites in the context of technologies for gene editing such as CRISPR-Cas9, and for the synthesis of artificial genes.

"Droplet operation" means any manipulation of one or more droplets on a microfluidic device. A droplet operation may, for example, include: loading a droplet into the microfluidic device; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a microfluidic device; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles.

"Gate driver" is a power amplifier that accepts a low-power input from a controller, for instance a microcontroller integrated circuit (IC), and produces a high-current drive input for the gate of a high-power transistor such as a TFT coupled to an EWoD pixel electrode. "Source driver" is a power amplifier producing a high-current drive input for the source of a high-power transistor. "Top plane common electrode driver" is a power amplifier producing a high-current drive input for the top plane electrode of an EWoD device.

"Nucleic acid molecule" is the overall name for DNA or RNA, either single- or double-stranded, sense or antisense. Such molecules are composed of nucleotides, which are the monomers made of three moieties: a 5-carbon sugar, a phosphate group and a nitrogenous base. If the sugar is a ribosyl, the polymer is RNA (ribonucleic acid); if the sugar is derived from ribose as deoxyribose, the polymer is DNA (deoxyribonucleic acid). Nucleic acid molecules vary in length, ranging from oligonucleotides of about 10 to 25 nucleotides which are commonly used in genetic testing, research, and forensics, to relatively long or very long prokaryotic and eukaryotic genes having sequences in the order of 1,000, 10,000 nucleotides or more. Their nucleotide residues may either be all naturally occurring or at least in part chemically modified, for example to slow down in vivo degradation. Modifications may be made to the molecule backbone, e.g. by introducing nucleoside organothiophosphate (PS) nucleotide residues. Another modification that is useful for medical applications of nucleic acid molecules is 2' sugar modifications. Modifying the 2' position sugar is believed to increase the effectiveness of therapeutic oligonucleotides by enhancing their target binding capabilities, specifically in antisense oligonucleotides therapies. Two of the most commonly used modifications are 2'-O-methyl and the 2'-Fluoro.

When a liquid in any form (e.g., a droplet or a continuous body, whether moving or stationary) is described as being "on", "at", or "over an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a microfluidic device, it should be understood that the droplet is arranged on the device in a manner which facilitates using the device to conduct one or more droplet operations on the droplet, the droplet is arranged on the device in a manner which facilitates sensing of a property of or a signal from the droplet, and/or the droplet has been subjected to a droplet operation on the droplet actuator.

"Each," when used in reference to a plurality of items, is intended to identify an individual item in the collection but does not necessarily refer to every item in the collection. Exceptions can occur if explicit disclosure or context clearly dictates otherwise.

DETAILED DESCRIPTION

In a first aspect, the present invention provides a novel method of adaptive transistor gate driving in AM-EWoD arrays featuring lower cost, standard low mobility a-Si TFTs with simple design to achieve higher driving rates than is normally possible with line-at-a-time driving. Amorphous silicon TFTs are much lower cost than LTPS and are routinely used to drive large LCD-TVs with panel size more than 40" in diagonal, so large area yield is not an issue. Adaptive gate driving accommodates higher EWoD driving frequencies by identifying blocks of gate lines that have the same data on each row and addressing multiple rows simultaneously. It is the nature of the way EWoD devices are used and driven that many gate lines have pixels with the same data on them. In this way the driving of TFT hardware is greatly simplified at limited extra cost for data processing.

Traditional Gate Line Addressing

A typical AM-EWoD device consists of a thin film transistor backplane with an exposed array of regularly shaped electrodes that may be arranged as pixels. The pixels may be controllable as an active matrix, thereby allowing for the manipulation of sample droplets. The array is usually coated with a dielectric material, followed by a coating of hydrophobic material. The fundamental operations of a typical EWoD device are illustrated in the sectional images of FIG. 1A-1C. FIG. 1A shows a diagrammatic cross-section of the cell of an example traditional EWoD device where droplet 104 is surrounded on the sides by carrier fluid 102 and sandwiched between top hydrophobic layer 107 and bottom hydrophobic layer 110. Propulsion electrodes 105 can be driven directly, e.g., by separate control circuits, or the electrodes can be switched by transistor arrays arranged to be driven with data (source) and gate (select) lines, much like an active matrix in liquid crystal displays (LCDs), resulting in what is known as active matrix (AM) EWOD. Typical cell spacing is usually in the range of about 120 µm to about 500 µm.

Typically a dielectric layer 108 is deposited over the propulsion electrodes 105 as well as the associated gate and data lines. The dielectric 108 should be thin enough and have a dielectric constant compatible with low voltage AC driving, such as available from conventional image controllers for LCD displays. For example, the dielectric layer 108 may comprise a layer of approximately 20-40 nm $SiO_2$ topped over-coated with 200-400 nm plasma-deposited silicon nitride. Alternatively, the dielectric layer 108 may comprise atomic-layer-deposited $Al_2O_3$ between 5 and 500 nm thick, preferably between 150 and 350 nm thick.

The hydrophobic layer 107/110 can be constructed from one or a blend of fluoropolymers, such as PTFE (polytetrafluoroethylene), FEP (fluorinated ethylene propylene), PVF (polyvinylfluoride), PVDF (polyvinylidene fluoride), PCTFE (polychlorotrifluoroethylene), PFA (perfluoroalkoxy polymer), PEP (fluorinated ethylene-propylene), ETFE (polyethylenetetrafluoroethylene), and ECTFE (polyethylenechlorotrifluoroethylene). Commercially available fluoropolymers Teflon® AF (Sigma-Aldrich, Milwaukee, Wis.) and FluoroPel™ coatings from Cytonix (Beltsville, Md.), which can be spin coated over the dielectric layer 408. An advantage of fluoropolymer films is that they can be highly inert and can remain hydrophobic even after exposure to oxidizing treatments such as corona treatment and plasma oxidation. Coatings having higher contact angles may be fabricated from one or more superhydrophobic materials. Contact angles on superhydrophobic materials typically exceed 150°, meaning that only a small percentage of a droplet base is in contact with the surface. This imparts an almost spherical shape to the water droplet. Certain fluorinated silanes, perfluoroalkyls, perfluoropolyethers and RF plasma-formed superhydrophobic materials have found use as coating layers in electrowetting applications and render it relatively easier to slide along the surface. Some types of composite materials are characterized by chemically heterogeneous surfaces where one component provides roughness and the other provides low surface energy so as to produce a coating with superhydrophobic characteristics. Biomimetic superhydrophobic coatings rely on a delicate micro or nano structure for their repellence, but care should be taken as such structures tend to be easily damaged by abrasion or cleaning.

While it is possible to have a single layer for both the dielectric and hydrophobic functions, such layers typically require thick inorganic layers (to prevent pinholes) with resulting low dielectric constants, thereby requiring more than 100V for droplet movement. To achieve low voltage actuation, it is usually better to have a thin inorganic layer for high capacitance and to be pinhole free, topped by a thin organic hydrophobic layer. With this combination it is possible to have electrowetting operation with voltages in the range +/−10 to +/−50V, which is in the range that can be supplied by conventional TFT arrays.

Figure 1B:
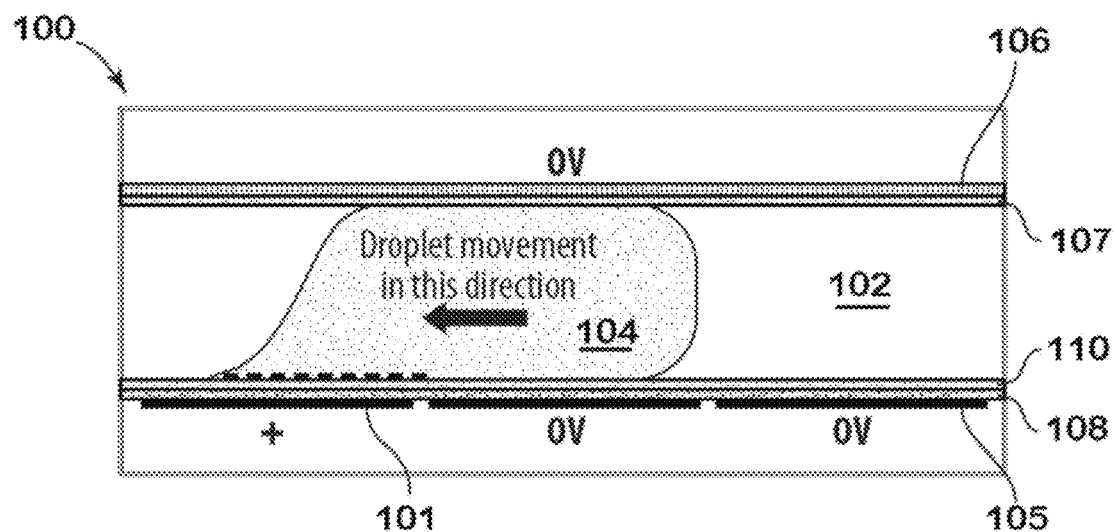
FIG. 1B illustrates EWoD operation with a static top plane voltage, i.e., DC Top Switching mode.
Figure 1C:
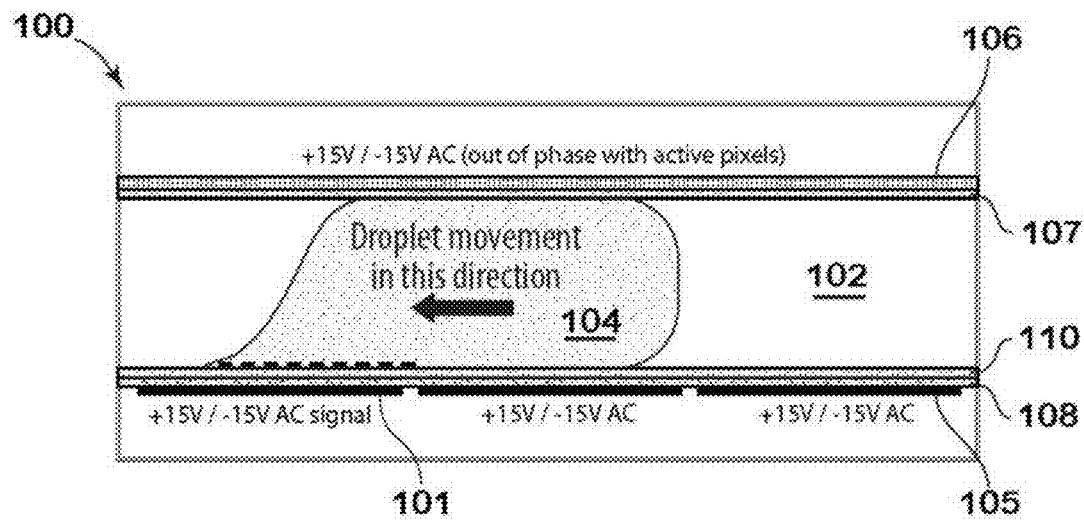
FIG. 1C illustrates EWoD operation with an alternating top plane voltage, i.e., top plane switching (TPS).

In reference to the methods disclosed herein, there are two "modes" of driving EWoDs: "DC Top Plane" and "Top Plane Switching (TPS)". FIG. 1B illustrates EWoD operation in DC Top Plane mode, where the top plane electrode 106 is set to a potential of zero volts. As a result, the voltage applied across the cell is the voltage on the active pixel, that is, pixel 101 having a different voltage to the top plane so that conductive droplets are attracted to the electrode. This limits driving voltages in the EWoD cell to about ±15 V because in a-Si TFTs the maximum voltage is in the range from about 15 V to about 20 V due to TFT electrical instabilities under high voltage operation. The alternative, Top-Plane Switching is shown in FIG. 1C, in which the driving voltage is effectively doubled to ±30 V by powering the top electrode out of phase with active pixels, such that the top plane voltage is additional to the voltage supplied by the TFT.

Figure 1D:
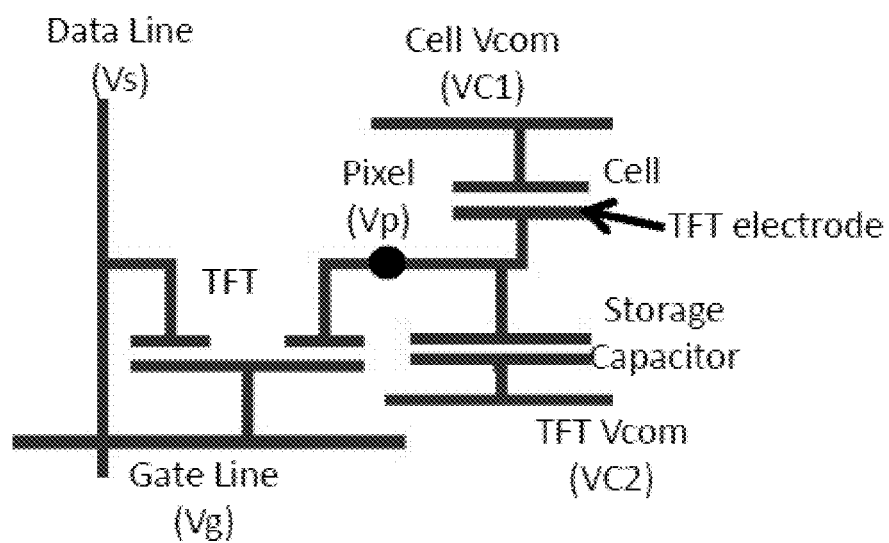
FIG. 1D is a schematic diagram of a TFT connected to a gate line, a data line, and a propulsion electrode (labeled TFT electrode).

Amorphous silicon TFT plates usually have only one transistor per pixel. As illustrated in in FIG. 1D, the transistor is connected to a gate line, a data line, and a propulsion electrode. When there is large enough positive voltage on the TFT gate then there is low impedance between the data line and pixel (Vg "ON"), so the voltage on the data line is transferred to the electrode of the pixel. When there is a negative voltage on the TFT gate then the TFT is high impedance and voltage is stored on the pixel storage capacitor and not affected by the voltage on the data line as the other pixels are addressed (Vg "OFF"). Ideally, the TFT should act as a digital switch. In practice, there is still a certain amount of resistance when the TFT is in the "ON" setting, so the pixel takes time to charge. Additionally, voltage can leak from Vs to Vp when the TFT is in the "OFF" setting, causing cross-talk. Increasing the capacitance of the storage capacitor $C_s$ reduces cross-talk, but at the cost of rendering the pixels harder to charge.

As mentioned in the background, alternative thin film materials for constructing transistors include low-temperature polymorphous silicon and metal oxide materials, such as tungsten oxide, tin oxide, indium oxide, and zinc oxide. In metal oxide applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Suitable active matrix backplanes including LTPS materials are available from manufacturers such as Sharp/Foxconn. Suitable active matrix backplanes including metal oxide semiconductors are available from manufacturers such as LG and BOE.

Figure 2:
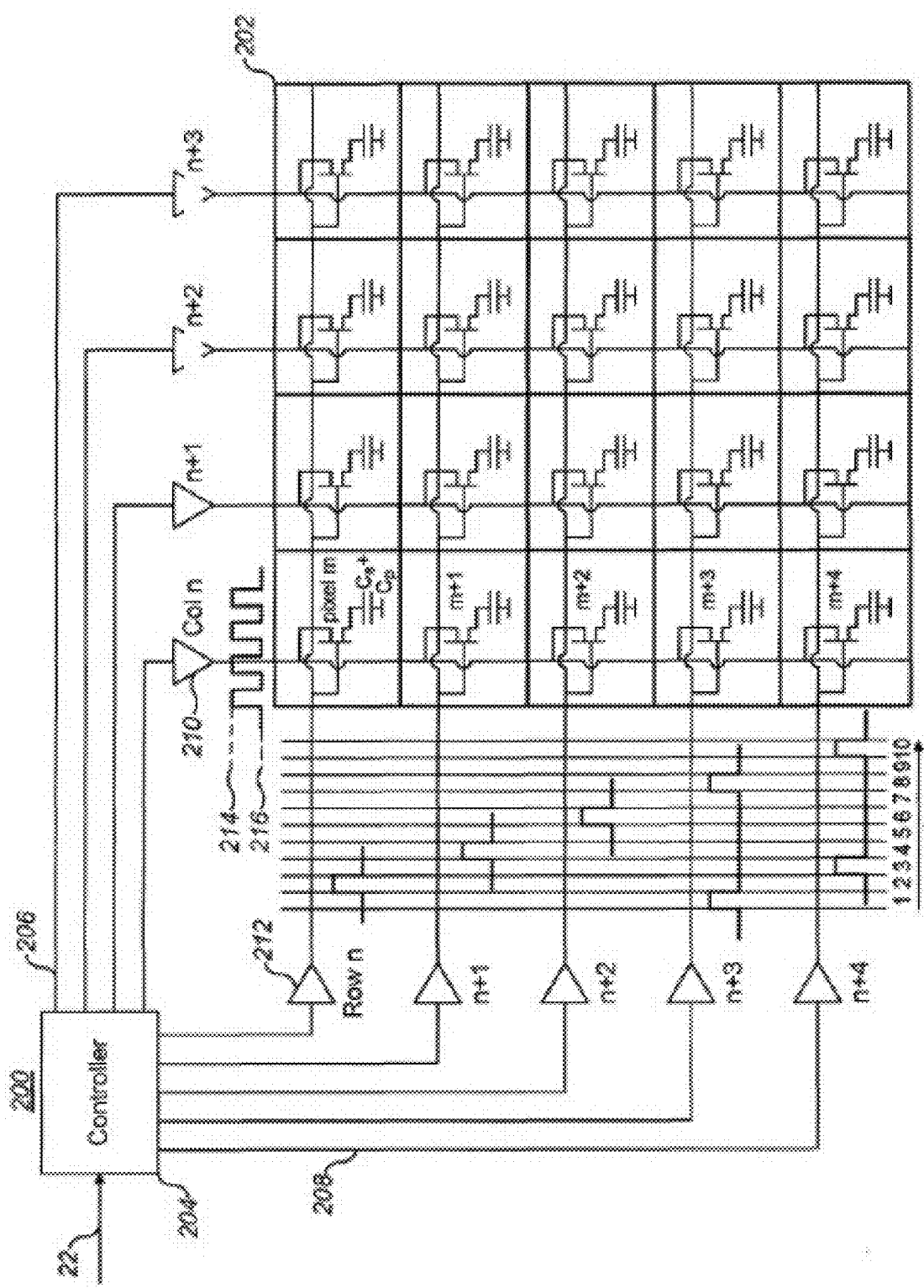
FIG. 2 is a diagrammatic view of an exemplary driving system for controlling droplet operation by an AM-EWoD propulsion electrode array.

FIG. 2 is a diagrammatic view of an exemplary driving system 200 for controlling droplet operation by an AM-EWoD propulsion electrode array 202. The AM-EWoD driving system 200 may be in the form of an integrated circuit adhered to a support plate. The elements of the EWoD device are arranged in the form of a matrix having a plurality of data lines and a plurality of gate lines. Each element of the matrix contains a TFT of the type illustrated in FIG. 1D for controlling the electrode potential of a corresponding electrode, and each TFT is connected to one of the gate lines and one of the data lines. The electrode of the element is indicated as a capacitor $C_p$. The storage capacitor $C_s$ is arranged in parallel with $C_p$ and is not separately shown in FIG. 2.

The controller shown comprises a microcontroller 204 including control logic and switching logic. It receives input data relating to droplet operations to be performed from the input data lines 22. The microcontroller has an output for each data line of the EWoD matrix, providing a data signal. A data signal line 206 connects each output to a data line of the matrix. The microcontroller also has an output for each gate line of the matrix, providing a gate line selection signal. A gate signal line 208 connects each output to a gate line of the matrix. A data line driver 210 and a gate line driver 212 is arranged in each data and gate signal line, respectively. The figure shows the signals lines only for those data lines and gate lines shown in the figure. The gate line drivers may be integrated in a single integrated circuit. Similarly, the data line drivers may be integrated in a single integrated circuit. The integrated circuit may include the complete gate driver assembly together with the microcontroller. The integrated circuit may be integrated on a support plate of the AM-EWoD device. The integrated circuit may include the entire AM-EWoD device driving system. Notably, the majority of commercially-available gate drivers are based on shift registers and cannot be used for adaptive driving. However, UC8152 (UltraChip Inc., San Jose, Calif.), a 480-channel gate/source programmable driver, includes the unusual capability of selecting any gate lines to be "ON" at any one time, so it may be used to simultaneously drive a plurality of lines. The UC8152 is a preferred driver chip for implementing the adaptive gate driving method described herein.

The data line drivers provide the signal levels corresponding to a droplet operation. The gate line drivers provide the signals for selecting the gate line of which the electrodes are to be actuated. A sequence of voltages of one of the data line drivers 210 is shown in FIG. 2. As discussed previously, when there is large enough positive voltage on the gate line then there is low impedance between the data line and pixel, so the voltage on the data line is transferred to the pixel. When there is a negative voltage on the TFT gate then the TFT is high impedance and voltage is stored on the pixel capacitor and not affected by the voltage on the data line. If no movement is needed, or if a droplet is meant to move away from a propulsion electrode, then 0 V will be applied to that (non-target) propulsion electrode. If a droplet is meant to move toward a propulsion electrode, an AC voltage will be applied to that (target) propulsion electrode. The figure shows four columns labelled n to n+3 and five rows labelled n to n+4.

As illustrated in FIG. 2, traditional AM-EWoD cells use line-at-a-time addressing, in which one gate line n is high while all the others are low. The signals on all of the data lines are then transferred to all of the pixels in row n. At the end of the line time gate line n signal goes low and the next gate line n+1 goes high, so that data for the next line is transferred to the TFT pixels in row n+1. This continues with all of the gate lines being scanned sequentially so the whole matrix is driven. This is the same method that is used in almost all AM-LCDs, such as mobile phone screens, laptop screens and LCD-TVs, whereby TFTs control the voltage maintained across the liquid crystal layer, and in AM-EPDs (electrophoretic displays).

One limitation on the speed at which a AM-TFT can be driven is the time that is required for each pixel electrode to be charged sufficiently to induce a visible state change. In the case of an ideal driving signal, a Maximum Line Time (MLT) can be calculated, which is a function of the Frame Time (FT), the Frame Rate (FR), and the Number of Gate Lines (n):

$$\text{Frame Time (FT)} = 1/\text{FR},$$

$$\text{MLT} = \text{FT}/n$$

For example, the MLT for an EWoD with gate 500 lines driven at 100 Hz would be 1/100/500=20 µs. In practice, gate and source lines are further characterized by RC time constants that depend on the TFT design and the size of the array. Typically, the RC time constants resulting in TFT switching that is slower than the ideal line time. Accordingly, an additional 2 to 3 µs are typically needed between one gate line being switched "OFF" and the next one "ON", resulting in real times for pixel charging typically 2 to 3 µs shorter than the MLT calculated for a given Frame Rate. Typically, EPDs and LCDs typically operate at frame rates between 60 and 120 Hz. A rate of 100 Hz may be taken for an example in estimating line times. Furthermore, AM-TFT displays often have about one thousand gate lines. Using these figures, a frame rate 100 Hz results in a frame time of 10 ms, and 1000 gate lines result in a maximum line time available of 10 ms/1000=10 µs.

Listed in Table I are EWoD frequencies, TFT frame rates and MLTs for TFT panels with different numbers of gate lines. Importantly, the TFT frame rate is twice the EWoD frequency because a complete EWoD cycle needs both a positive and negative pulse. MLTs greater than 8 µs are in bold, meaning that a simple a-Si TFT array using line-at-a-time addressing is likely able to drive them while retaining a satisfactory performance MLTs shorter than 8 µs are in italics, meaning that a-Si TFTs with standard driving is unlikely to achieve high EWoD frequencies:

TABLE I

Maximum Line Times for different EWoD frequencies

| EWoD Frequency (Hz) | TFT Frame Rate (Hz) | Frame Time (ms) | Maximum Line Time (No. of Scan Lines) | | | |
|---|---|---|---|---|---|---|
| | | | (100) (μs) | (200) (μs) | (500) (μs) | (1000) (μs) |
| 50 | 100 | 10.0 | 100.00 | 50.0 | 20.0 | 10.0 |
| 100 | 200 | 5.0 | 50.0 | 25.0 | 10.0 | 5.0 |
| 200 | 400 | 2.5 | 25.0 | 12.5 | 5.0 | 2.5 |
| 400 | 800 | 1.3 | 12.5 | 6.3 | 2.5 | 1.3 |
| 600 | 1200 | 0.8 | 8.3 | 4.2 | 1.7 | 0.8 |
| 800 | 1600 | 0.6 | 6.3 | 3.1 | 1.3 | 0.6 |
| 1000 | 2000 | 0.5 | 5.0 | 2.5 | 1.0 | 0.5 |

Thus, as shown in Table I, for small arrays, i.e., 200 scan lines it is possible to drive the array at greater than 200 Hz, but even 200 Hz driving quickly becomes out of the question for larger arrays, such as 500 scan lines or larger. For the most, part it is simply not feasible to use line-at-a-time addressing at 1000 Hz.

Adaptive Gate Line Addressing

As seen above, in traditional line-at-a-time addressing methods each row is individually driven, so the number of gate periods is always equal to the number of gate lines. This creates difficulty in operating EWoDs with a-Si TFT when the arrays are driven at high frame rates. To alleviate this problem, an adaptive gate driving method may be used, whereby the gate lines of the active matrix are bundled into blocks, where the blocks include two or more gate lines that will simultaneously receive the same gate signal. Instead of each gate line being individually addressed in a consecutive fashion, the lines of each block are driven simultaneously. As a result of this bundling, the frame time (FT) canic partitioned into a smaller number of gate periods than in traditional line-at-a-time addressing. This, is turn, results in longer MLTs, so the gate driving method of this aspect of the invention may be implemented to attain MLTs of a duration compatible with a-Si TFT arrays even when the EWoD is operated at high frame rates. That is, the line time can much more easily account for the time required for the RC lag between lines because the line time is far longer than it would be if line-at-a-time switching were used. This new method of driving is herein defined as "Adaptive Gate Line Addressing" because the sequence of gate line addressing depends on the image content, not the number of gate lines.

Figure 3A:
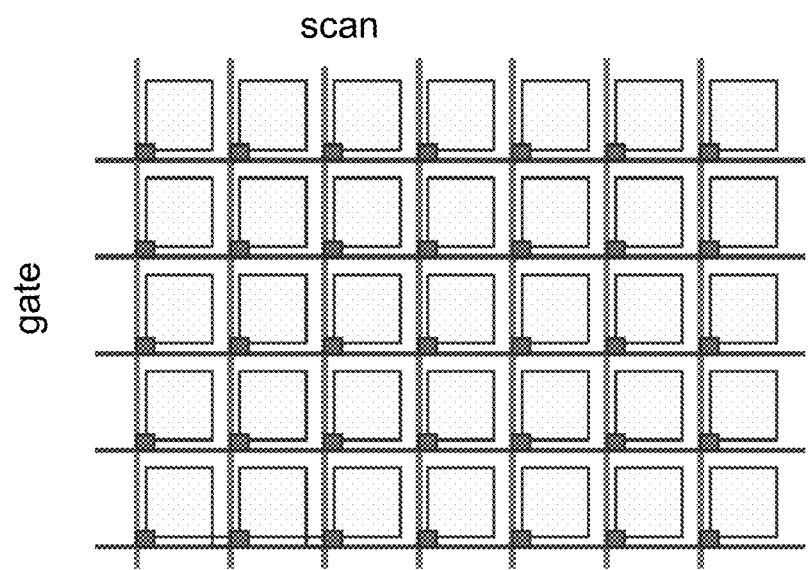
FIGS. 3A-3D are schematic illustrations of line-at-a-time addressing for a 3×3 group of pixels actuated within a single update frame on an EWoD cell driven in a line-at-a-time fashion using DC Top Switching mode, i.e., the top plane voltage is held constant.
Figure 3B:
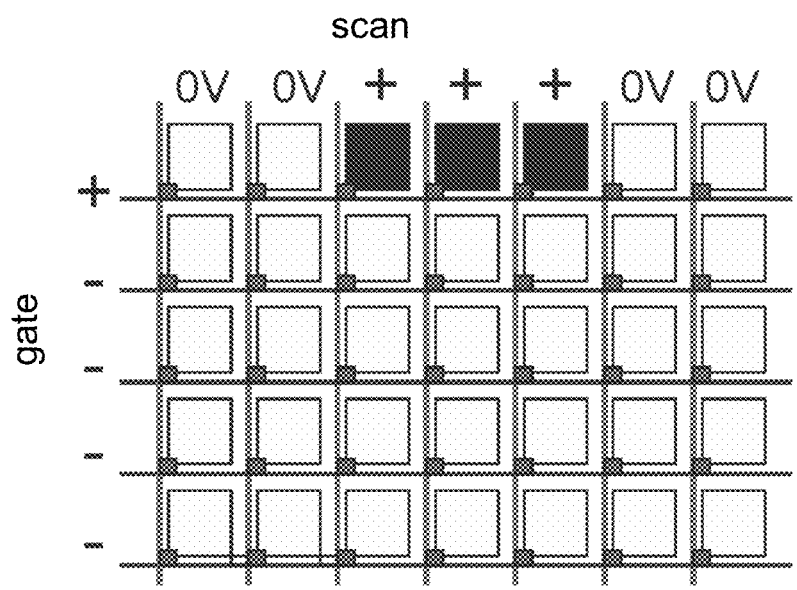
Figure 3C:
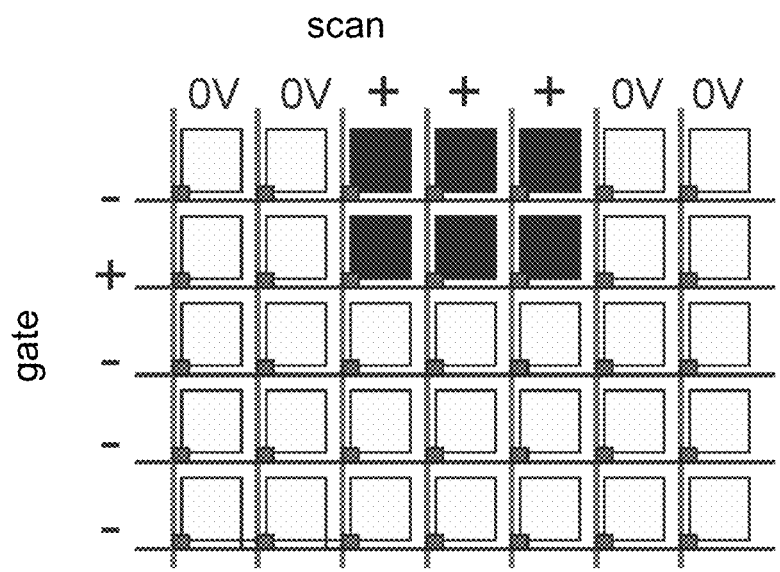
Figure 3D:
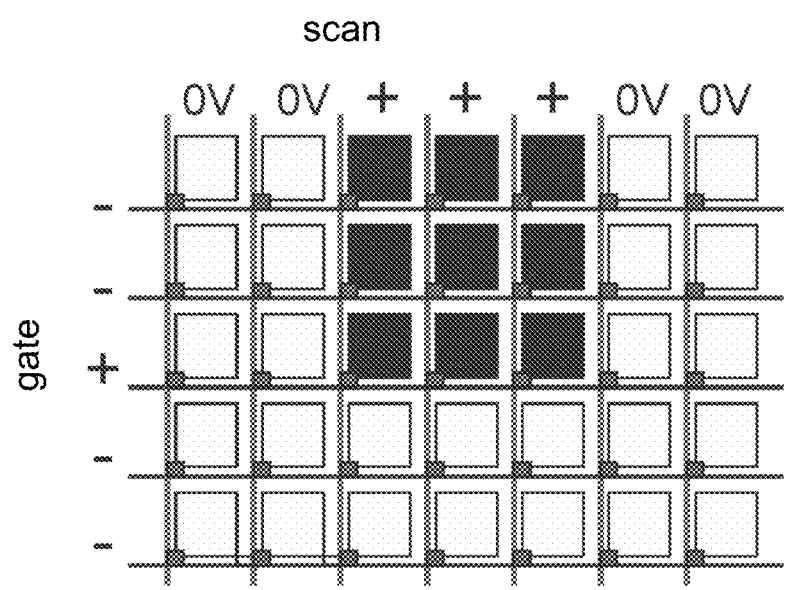

To use an example, FIGS. 3A-3D illustrate line-at-a-time addressing for a simple 3×3 group of pixels actuated within a single frame in an EWoD cell driven in DC Top Switching mode. (For a cell driven in TPS, the pixels labelled "0 V" would instead be at −15 V, in-phase with the top plane, and the timing of pulses would be the same.) FIG. 3A depicts the beginning of the driving sequence, when all pixels are non-active, i.e. at a potential of 0 V. In FIG. 3B, gate line 1 is addressed for about 10 μs, and data lines 3, 4, and 5 are driven to positive voltages to actuate their respective pixels, illustrated as dark squares. In FIG. 3C, gate line 2 is subsequently addressed in the following 10 μs and data lines 3, 4, and 5 are driven once again, this time to charge their pixels in the second row. Importantly, the storage capacitor at each pixel helps the pixels in the first row to maintain their charge state after gate line 1 has been addressed. Finally, and as depicted in FIG. 3D, gate line 3 is addressed, and data lines 3, 4, and 5 are driven one more time to actuate the last three pixels. It can be seen that the data line signals do not change during the addressing of gate lines 1, 2, and 3. As such, one could have achieved the same result by addressing gate lines 1, 2, and 3 simultaneously, thereby partitioning the frame time (FT) into fewer, longer gate periods, or using fewer numbers of the same gate line times, resulting in a larger overall frame rate (FR).

Figure 4A:
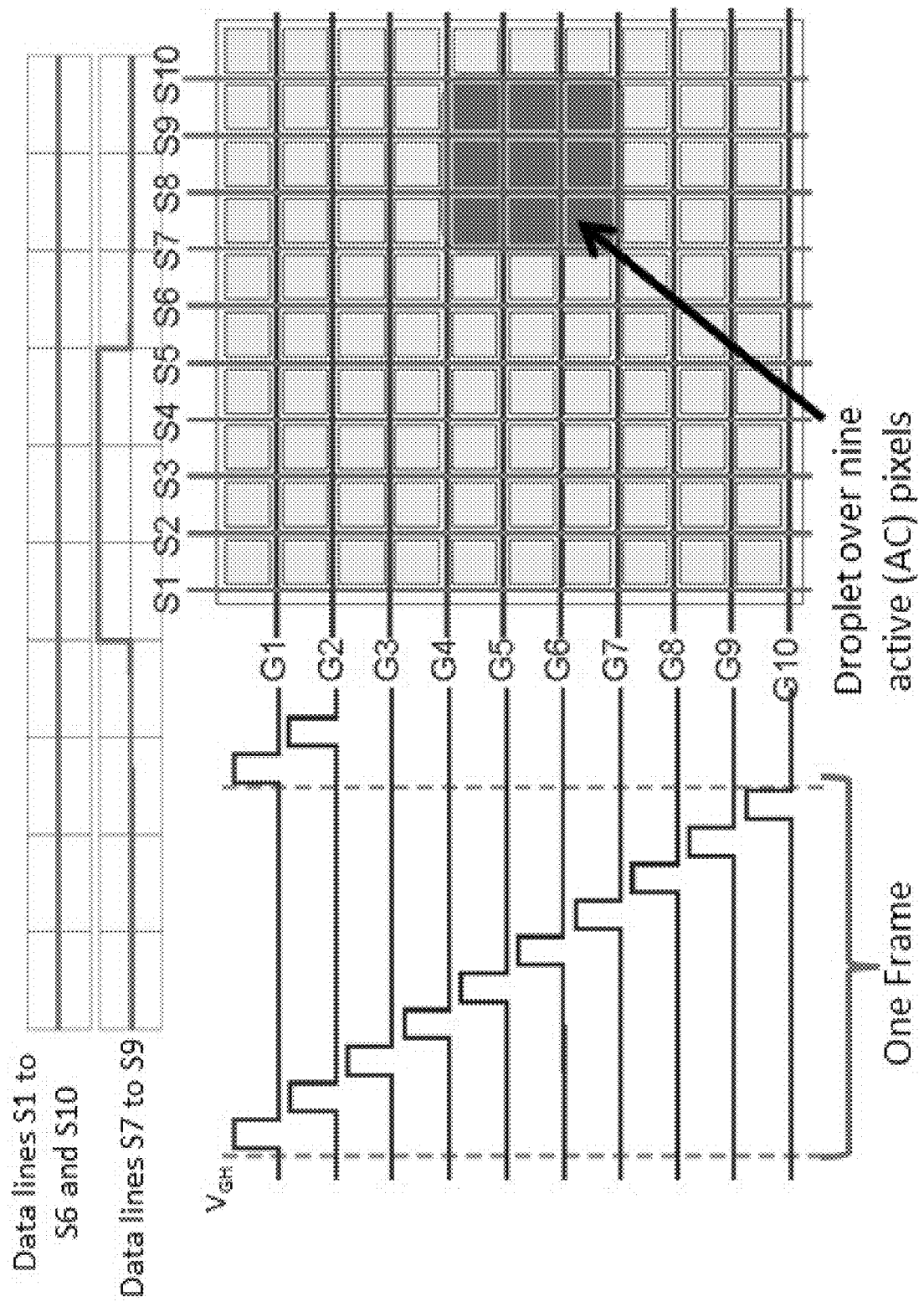
FIG. 4A illustrates an example of line-at-a-time addressing on an EWoD array.
Figure 4B:
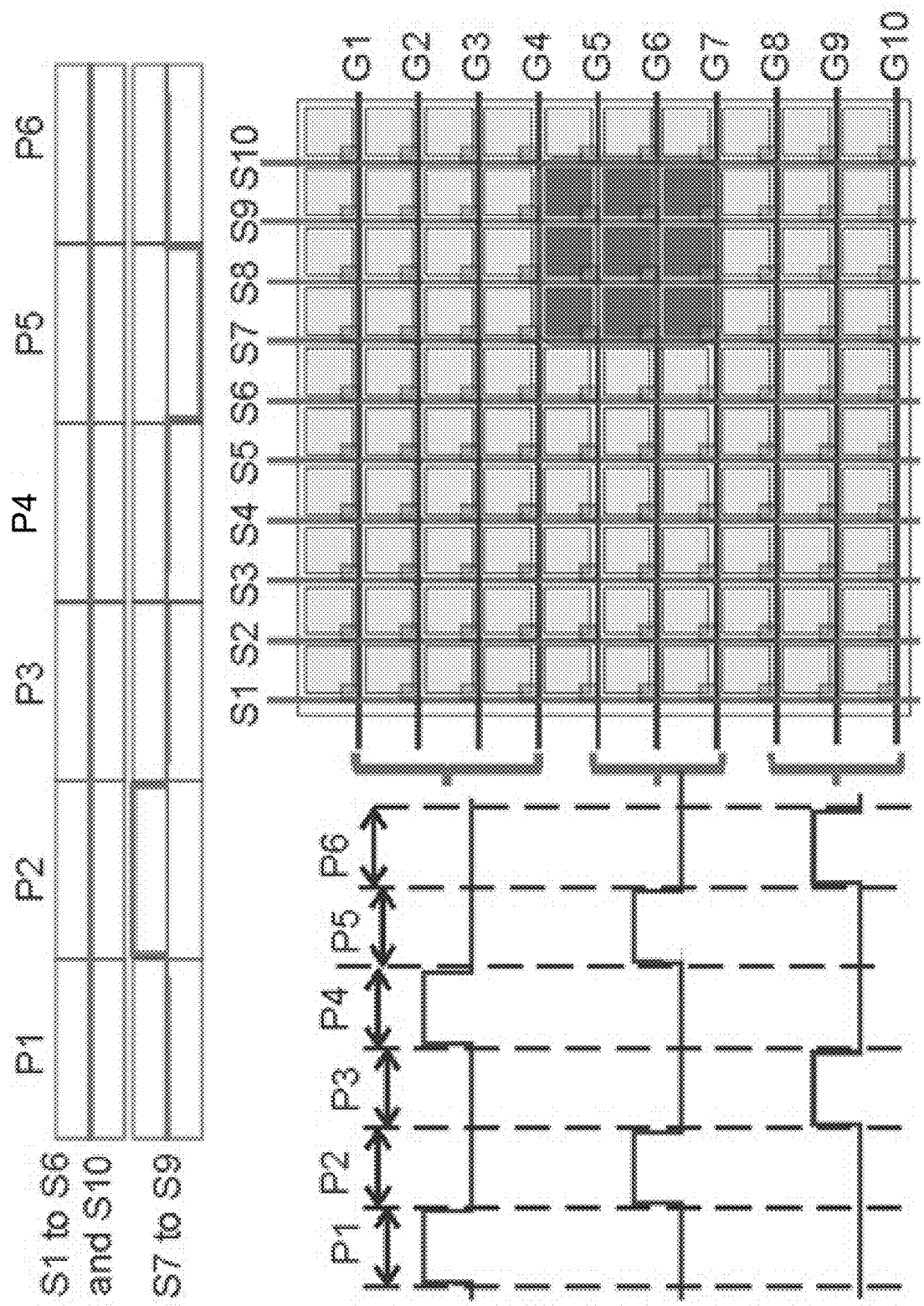
FIG. 4B illustrates an example of adaptive gate driving of the invention on the same array as in FIG. 4A to energize the same propulsion electrodes.

The Example shown in FIGS. 4A and 4B illustrates the effect of charging multiple gate lines at the same time in a 10×10 array with 3×3 active pixels. FIG. 4A shows line-at-a-time addressing. FIG. 4B shows adaptive gate driving. In FIG. 4A, the MLT for 1 kHz EWoD frequency with ten gate lines would be 1/2000/10=50 μs. (N.B., the MLT of FIG. 4A can be supported by a-Si TFT array, but this example only has ten gate lines, so it is not a practical size for meaningful AM-EWoD activities).

In contrast, FIG. 4B shows the same 10×10 array driven by sequential adaptive gate blocks. As shown in FIG. 4B, the data signals on gate lines 1 to 4 are the same and the data signals on gate lines 8 to 10 are the same. Therefore, it is possible to use non-contiguous adaptive gate line addressing where gate lines 1 to 4 and 8 to 10 are addressed at the same time in a way that will not interact with data signals on data lines S7 to S9, and then have gate lines 5 to 7 addressed as a second block. This instance may be classified as "non-contiguous adaptive gate line driving" because gate lines with the same pixel data on them are all driven simultaneously, even if there are blocks of gate lines with different pixel signals between them. Gate lines driven together as members of a gate block need not be contiguous. Rather, lines not belonging to the block may be interposed between different sections of the same block, the only requirement being that the lines of the block be driven within the same gate period. Thus, whereas FIG. 4A requires a frame of ten line times, FIG. 4B only requires two when non-contiguous driving is used.

Figure 5:
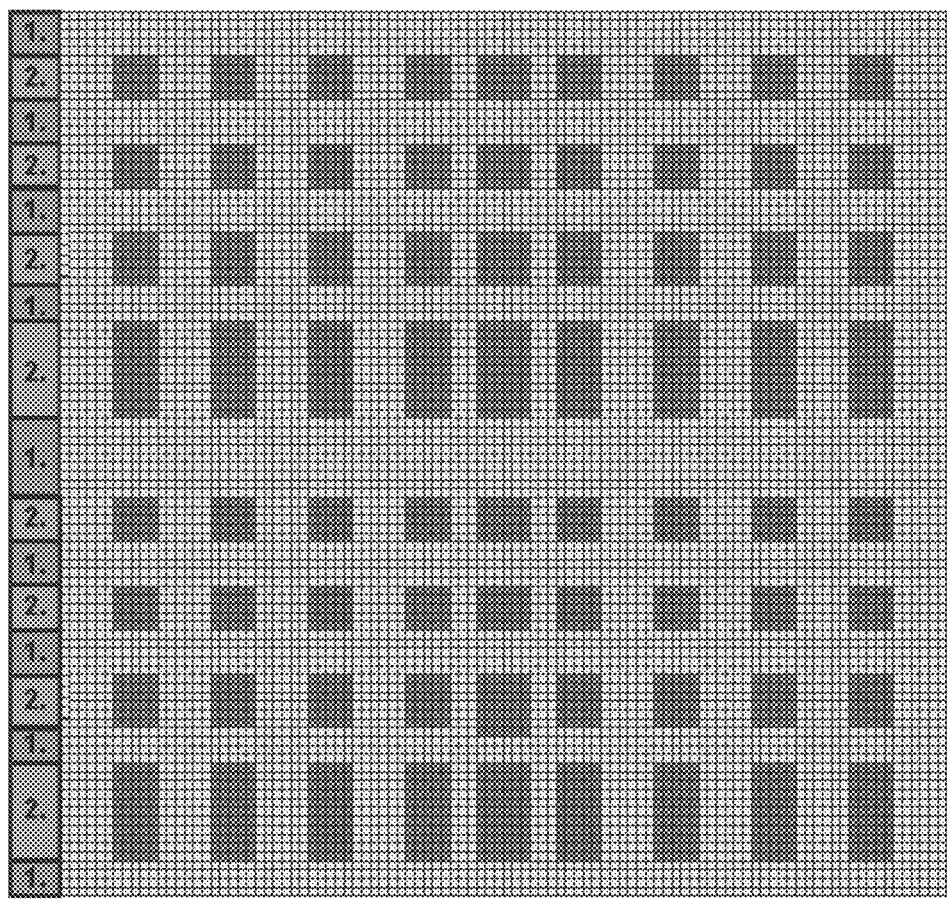
FIG. 5 is a schematic illustration of adaptive gate driving on a 100×100 pixel array, showing that gate blocks can be used to greatly simplify the driving.

The increase in MLT duration is more substantial when high-frequency driving is applied to arrays having large numbers of gate lines. FIG. 5 shows an exemplary repeated pattern that is ideal for high-frequency driving with AM-EWoD. In FIG. 5, there are seventy two blocks of active pixels of different sizes on a 100×100 pixel array. For line-at-a-time addressing and 1 kHz EWoD frame rate this would give a gate MLT of 1/2000/100=5 μs. Accordingly, an inexpensive a-Si TFT array using line-at-a-time addressing would likely not be able to support 1 kHz EWoD driving.

Looking at FIG. 5, each of the gate lines has only one of two source line patterns. The horizontal lines with rectangles labelled "1" to their left are all non-active. The horizontal lines with rectangles labelled "2" to their left have a mixture of active and non-active pixels, but all of the type "2" lines are in the same horizontal position. Using contiguous adaptive gate line driving this pattern would be broken down into seventeen gate line blocks aligned with the green and cyan rectangles, resulting in a MLT of 1/2000/17=29.4 μs, when driven at 1 kHz frame rate. This could easily be driven by an a-Si TFT array. Furthermore, if the array is arranged into non-contiguous gate line blocks, then only two gate blocks need to be addressed. The first blocks driven at the same time would be the rows with "1" rectangles to their left. The second blocks driven at the same time would be the rows with "2" rectangles to their left. This would give a Maximum Gate Line Time of 1/2000/2=250 μs, practically leisurely!

Gate blocks can change in number and relative positioning to individually suit each of the sequence of steps defining a given droplet operation. This feature is exemplified in FIGS. 6A-6H, illustrating a multi-step droplet operation for rearranging four droplets. As shown in FIGS. 6A-6H, the gate line block arrangement changes every time one of the droplets moves in the vertical direction. In such instances, prior to, or during the droplet operation, real-time calculations are performed to determine gate line block arrangements specific to each subsequent step. Thereafter, the gate lines are arranged into blocks specifically tailored to driving the pixels to be actuated in the course of the step.

Figure 6A:
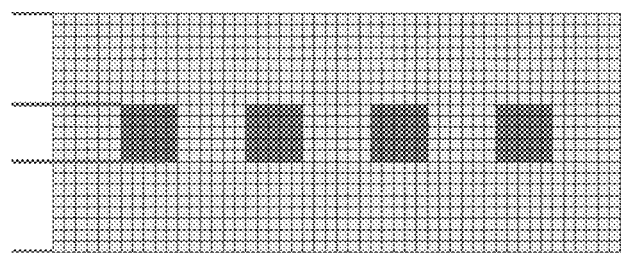
FIGS. 6A-6H are schematic illustrations of an adaptive gate driving method for completing a multi-step droplet operation.
Figure 6B:
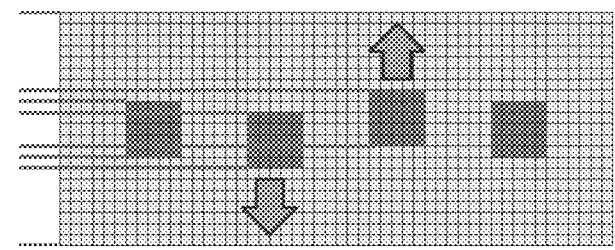
Figure 6C:
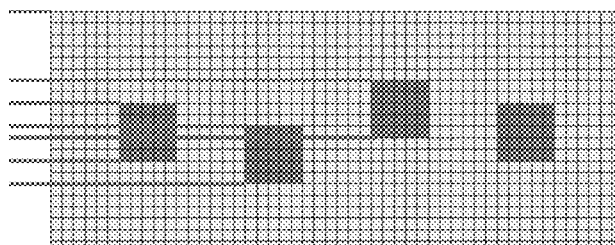
Figure 6D:
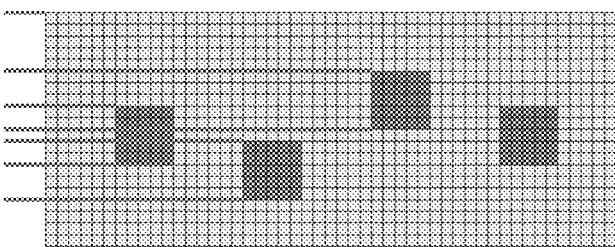
Figure 6E:
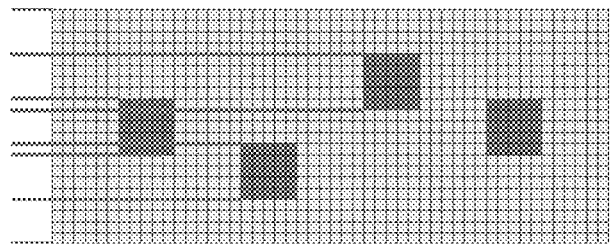
Figure 6F:
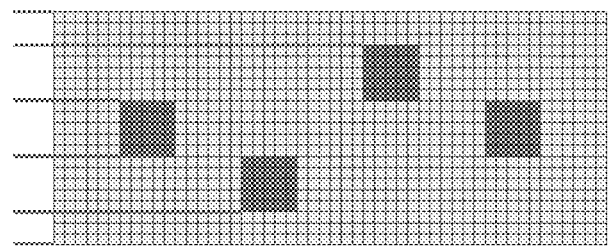
Figure 6G:
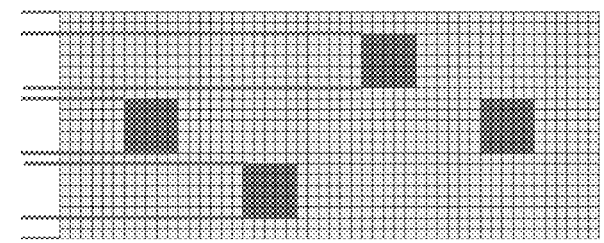
Figure 6H:
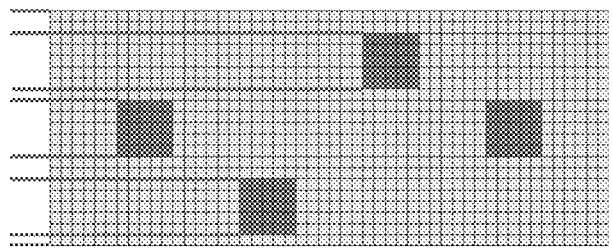

In FIG. 6A, the four droplets are aligned, and the array may be arranged into either 3 contiguous or 2 non-contiguous gate line blocks. In step 1, as depicted in FIG. 6B, the two inner droplets are moved vertically, along the direction of either blue arrow. Here, the array is arranged into either 7 contiguous or 6 non-contiguous blocks. Steps 2, 3, and 4, illustrated in FIGS. 6C, 6D, and 6E, respectively, are also carried out with 7 contiguous or 6 non-contiguous blocks as the droplets continue to separate vertically. By step 5, depicted in FIG. 6F, the driving has actually simplified and results in 5 contiguous or 4 non-contiguous blocks. Finally, steps 6 and 7, depicted in FIGS. 6G and 6H, are each performed with an arrangement featuring 7 contiguous or 4 non-contiguous blocks.

Figure 7:
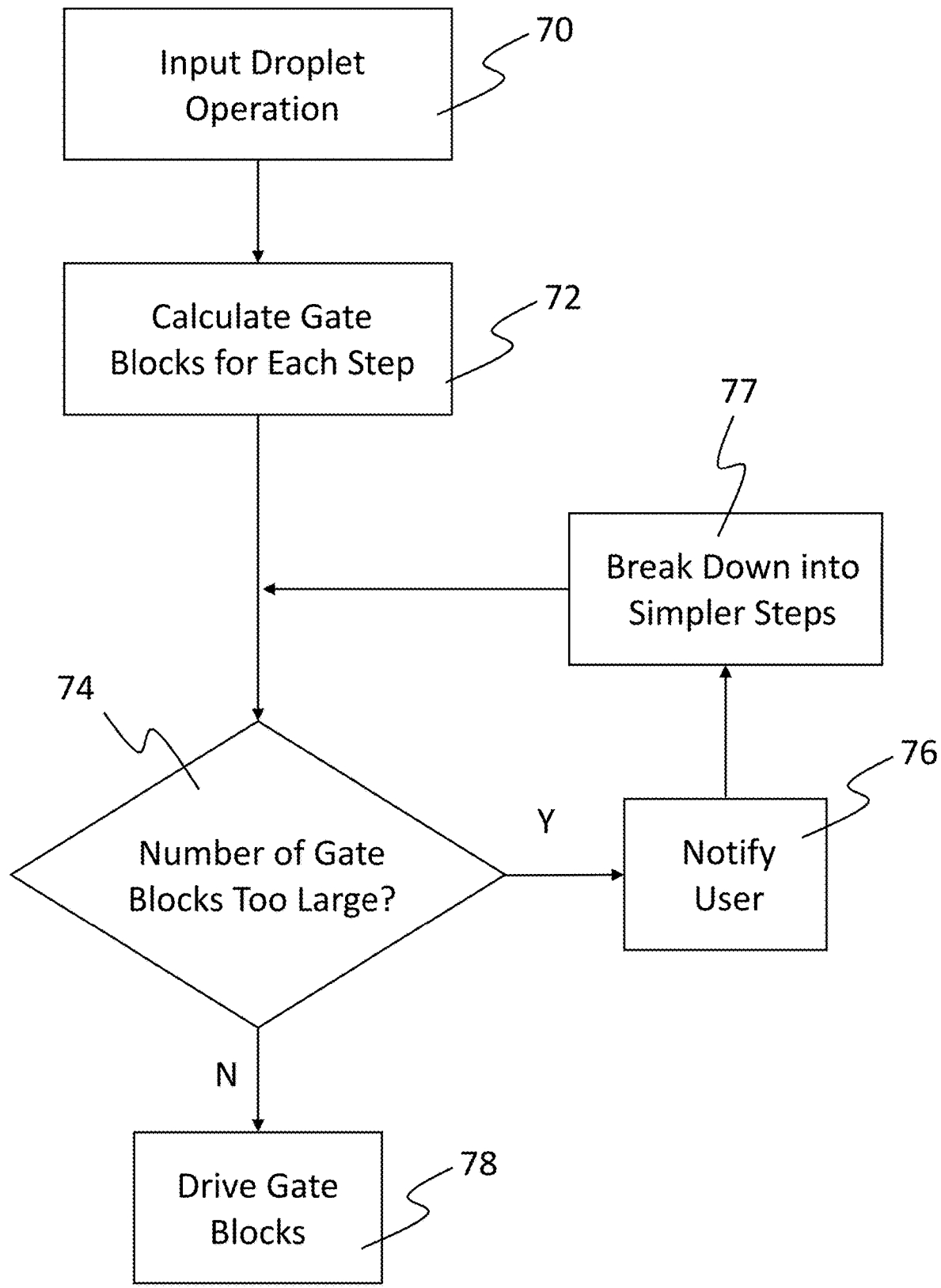
FIG. 7 is a flow chart illustrating the implementation of an adaptive gate driving method for a multi-step droplet operation.

Gate line block arrangements may be easily calculated and implemented based on the requirements of the droplet operation to be performed on an EWoD device. The flow chart of FIG. 7 illustrates an example embodiment of this process. In step 70, a user inputs the droplet operation they want to make in the form of instructions which are stored in a computer-readable medium that is accessed by a processing unit of the device. The instructions cause the processing unit to calculate the number of gate blocks for each step of the droplet operation (72). If the number of gate blocks of one or more steps is too large (74) for driving the EWoD device at a target frequency (for example, 1 kHz), then the processing unit notifies the user (76), and the droplet operation may be broken down into a larger number of simpler steps (77) that can meet the demands of the desired frame rate. If the number of gate blocks does not exceed a set threshold, then the processing unit outputs line driving instructions to the array controller. Based on the line driving instructions, the controller signals the drivers of gate lines corresponding to each gate block (78), simultaneously driving all the lines of the block. In alternate embodiments, the EWoD array may be driven at a lower frequency while more complicated steps are being executed, although this might adversely affect device lifetime. While this process may seem unduly complicated, many bioassays, synthetic protocols, or analytical processes are hugely repetitive. Thus, once a preferred protocol has been programmed it can be easily executed as a driving script. In some instances, this will result in many identical workflows being implemented on the same AM-EWoD device. In other instances, it will result in many AM-EWoD devices of the same construction using identical workflows, e.g., for a bioassay.

Figure 8A:
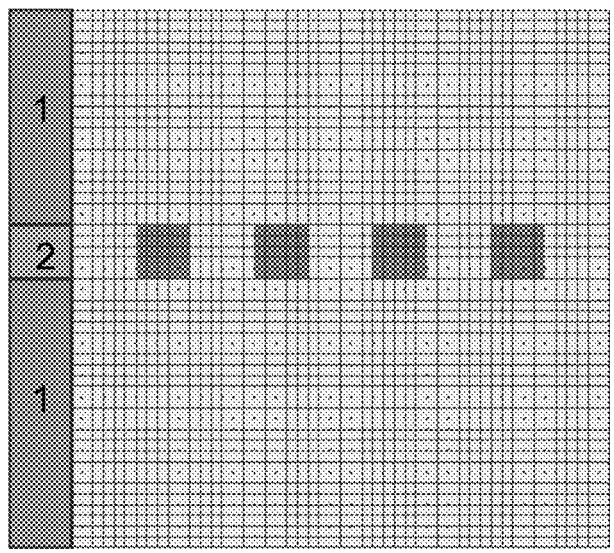
FIGS. 8A-8D illustrate an example of modulating the length of charging pulses according to the size of individual gate blocks.
Figure 8B:
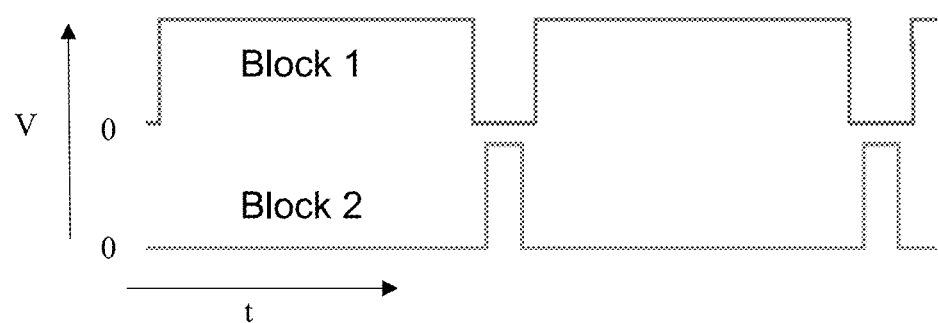
Figure 8C:
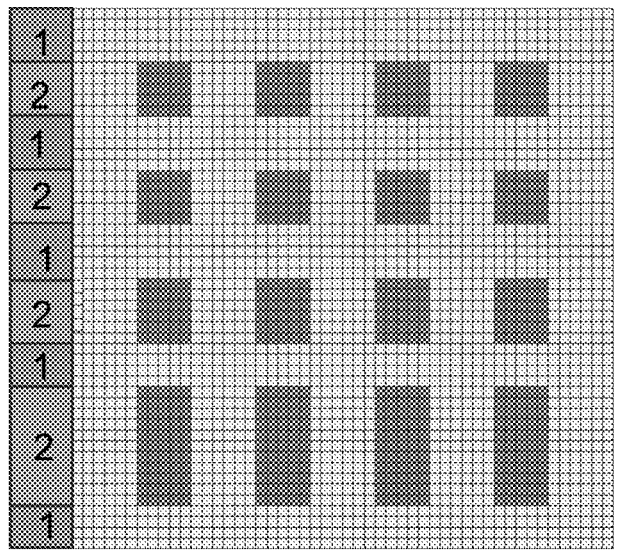
Figure 8D:
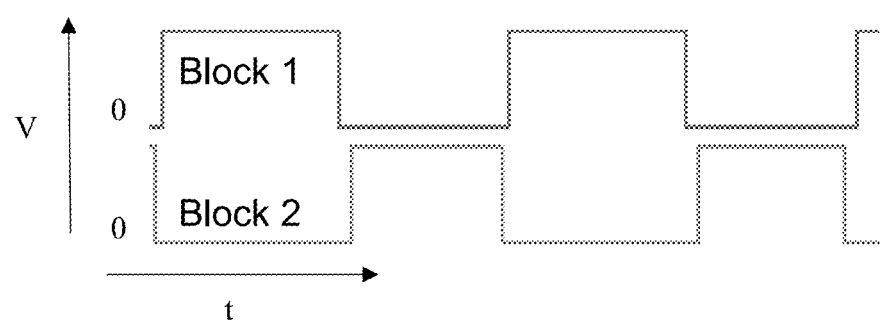

In reality, driving two or more gate lines simultaneously with the same data line results in a larger current load due to the plurality of storage capacitors simultaneously being charged by the data driver. (The load is directly proportional to the number of lines in a given block.) This effect may be partially or totally offset by adopting data line drivers with larger output currents. Alternatively, longer charging pulses may also be used to actuate large blocks of gate lines, i.e., allowing the respective storage capacitors to be filled slowly. Such a drive scheme is exemplified in FIG. 8A, where the matrix is subdivided into Block 1 having 45 gate lines and Block 2 which instead has only 5. As a result of this arrangement, Block 1 places onto the data driver a load nine times that of Block 2. In one embodiment, this imbalance may be offset by scaling the respective gate periods in direct proportion to the number of gates in each block. This approach is implemented in the pulse sequence of FIG. 8B, where the pulse addressing Block 1 is of longer length than that of Block 2. In a further example, the partitioning of gate lines depicted in FIG. 8C is such that Block 1 includes 23 rows while Block 2 has 27. Here too, as illustrated in FIG. 8D, the pulse length ratio may be set to remedy this numerical imbalance, though a smaller correction is needed than in the example of FIG. 8B. More broadly, if a first block includes X gate lines, a second block includes Y gate lines, X being greater than Y, then the length of the respective pulses may be adjusted such that a ratio $P_X:P_Y$ is greater than 1, $P_X$ being the length of the pulse driving the first block, and $P_Y$ that of that driving the second block.

Figure 9A:
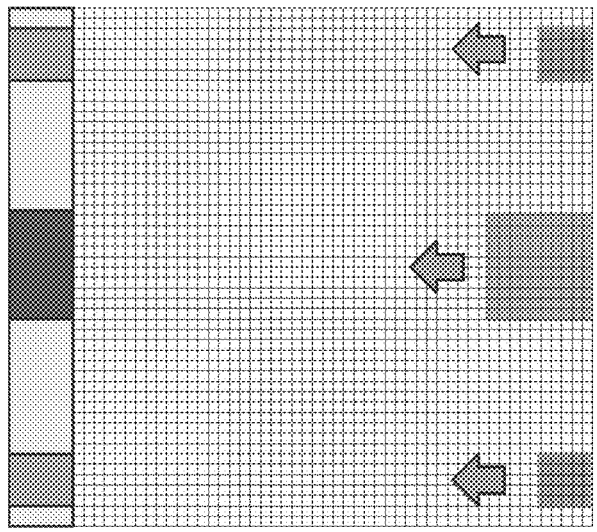
FIG. 9A-9P are schematic illustrations of an adaptive gate driving multi-step droplet operation.
Figure 9B:
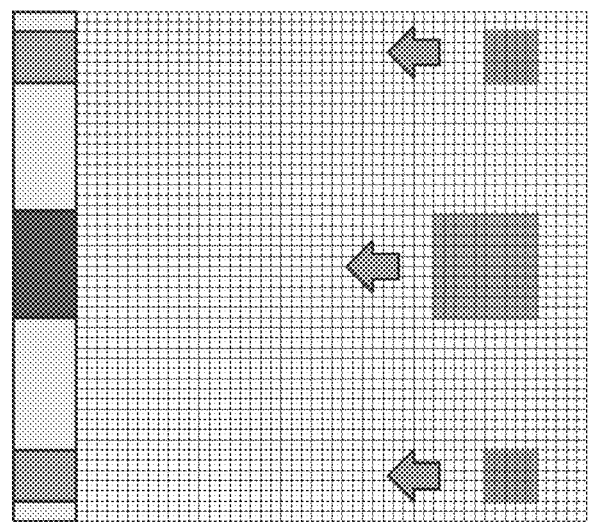
Figure 9C:
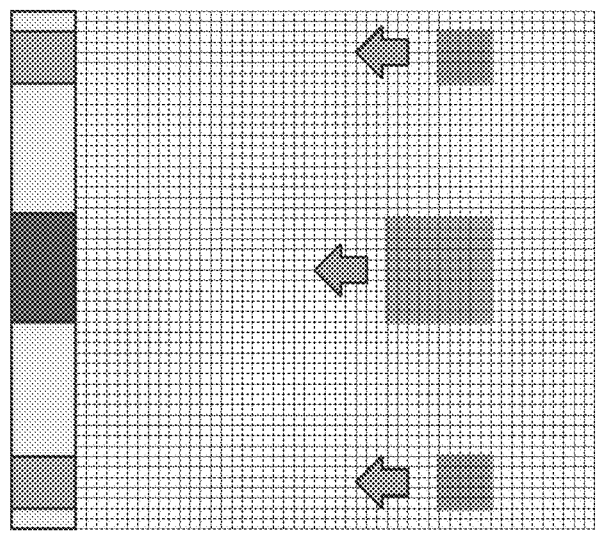
Figure 9D:
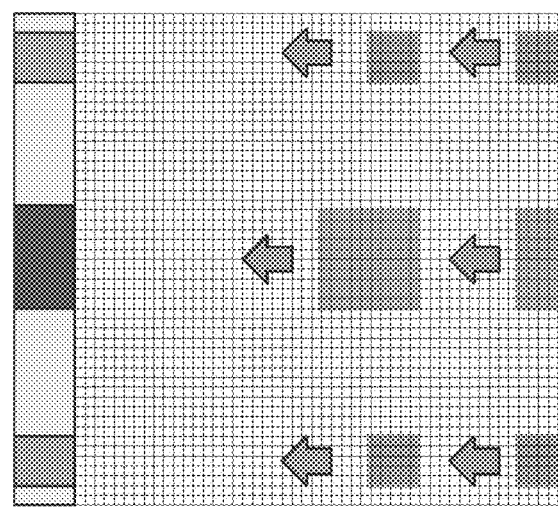
Figure 9E:
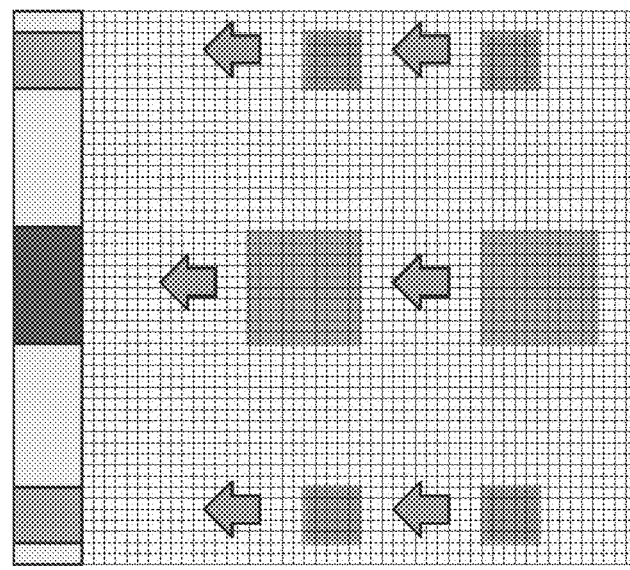
Figure 9F:
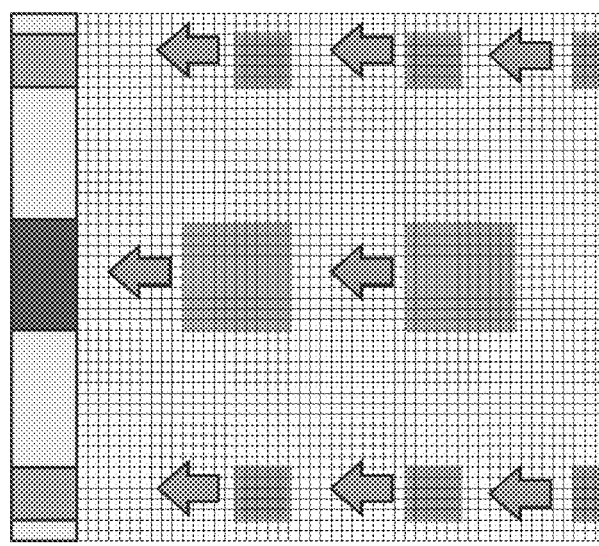
Figure 9G:
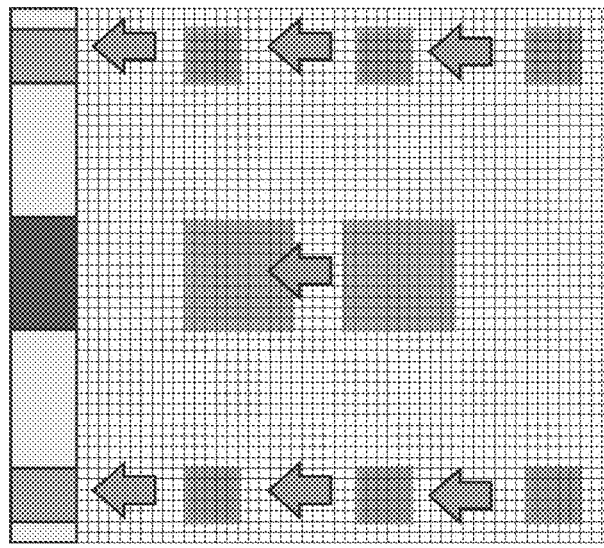
Figure 9H:
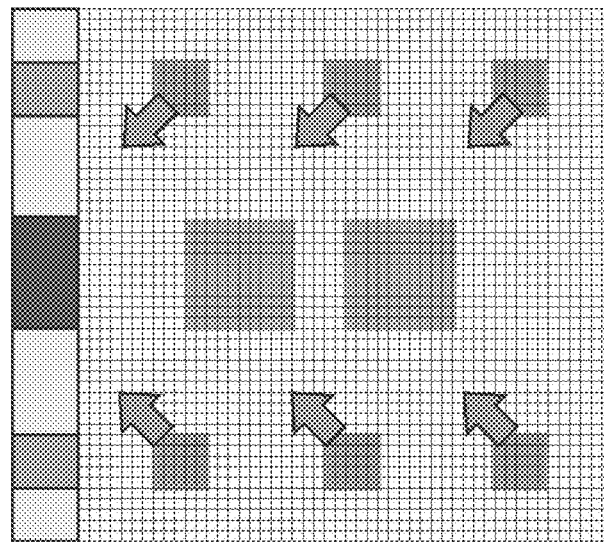
Figure 9I:
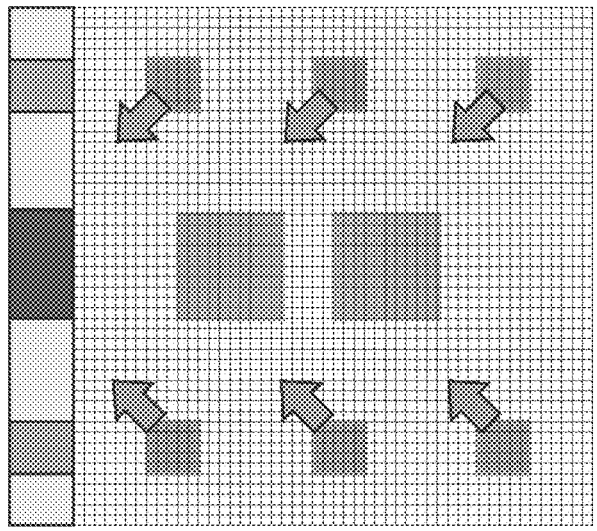
Figure 9J:
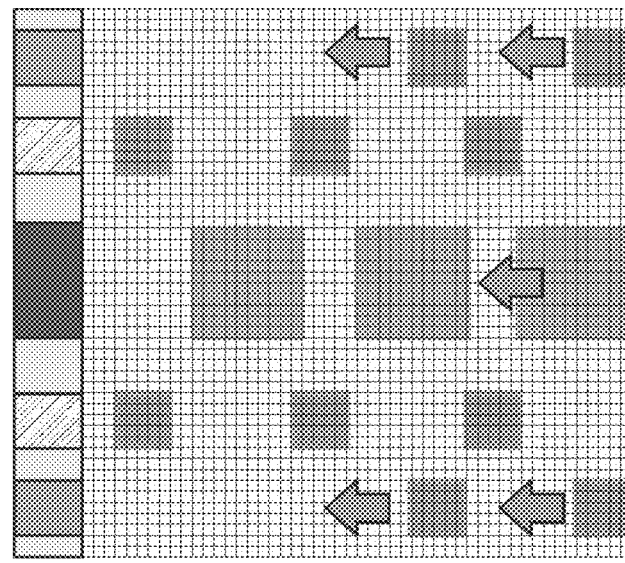
Figure 9K:
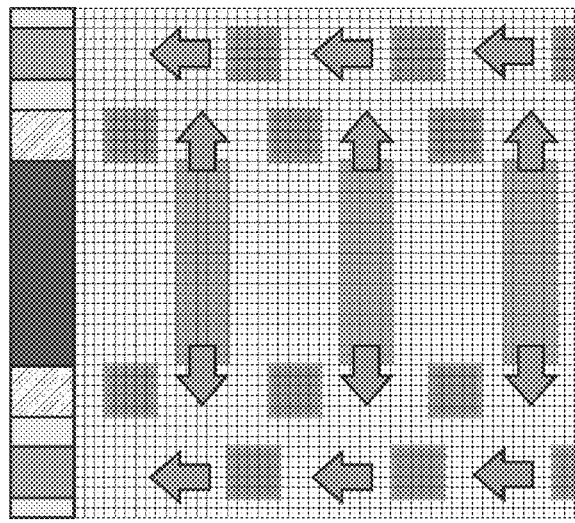
Figure 9L:
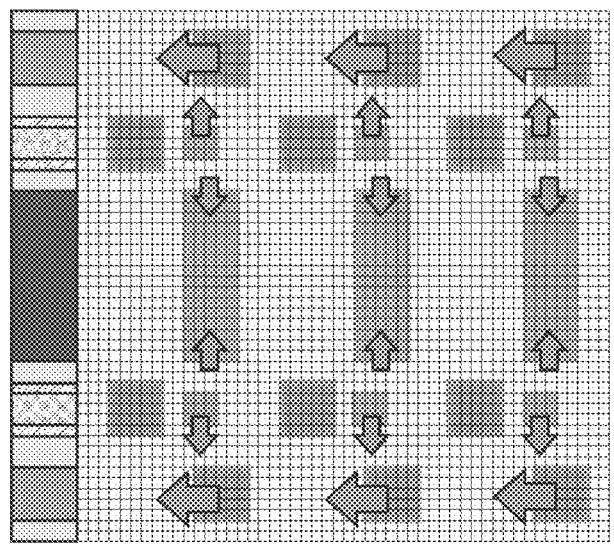
Figure 9M:
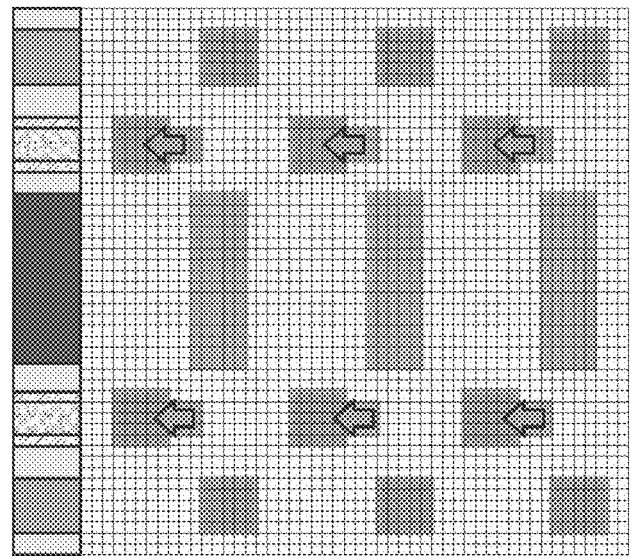
Figure 9N:
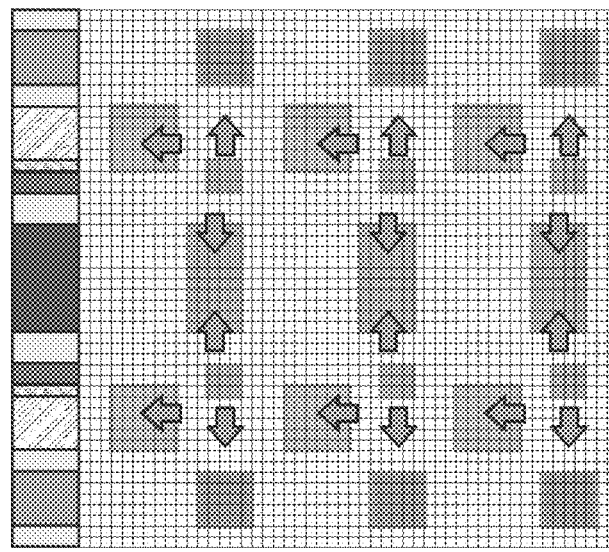
Figure 9O:
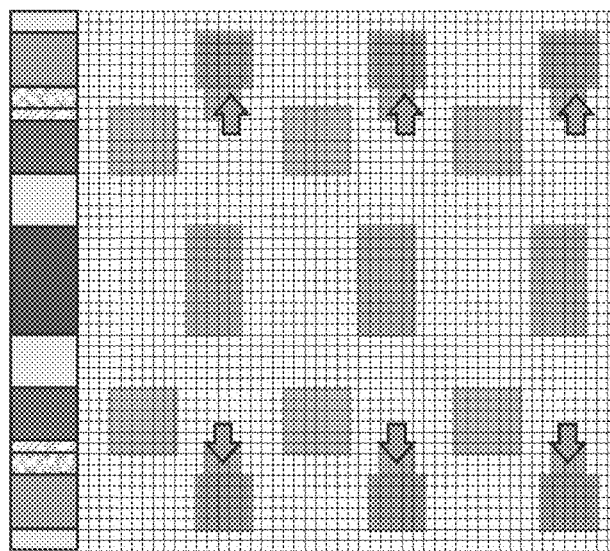
Figure 9P:
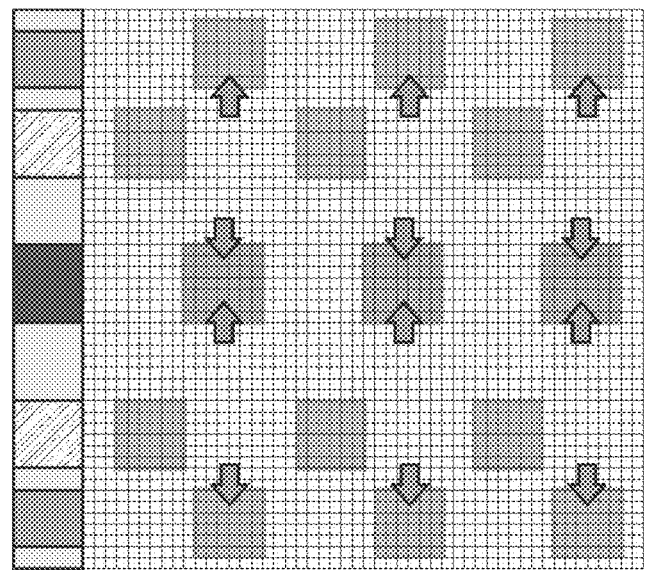

Finally FIGS. 9A-9P illustrate a multi-step droplet operation including droplet movement and merging with up to 21 droplets present on the EWoD surface at one time. The number of adaptive gate blocks changes continuously depending on the how the blocks are aligned but for this sequence the maximum number of contiguous adaptive gate blocks is fifteen and the maximum number of non-contiguous adaptive gate blocks is six. This indicates that a considerable number of complicated droplet movements, such as merging and splitting droplets may be carried out at the same time with adaptive gate driving. Overall, however, using an adaptive gate driving scheme will allow such movements to be completed at a frame rate of 1 kHz or greater, which will greatly decrease the amount of degrading electrochemistry that happens to the AM-EWoD surface, especially when working with droplets having high ionic strength, such as acids and salts.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:
1. A method of driving an active matrix electrowetting on dielectric (AM-EWoD) device, the method comprising:
   providing a device having:
      a processing unit;
      a transistor matrix, each transistor of the matrix being operably connected to a gate line, a data line, and a propulsion electrode,
      a plurality of gate lines, each gate line being operably connected to a gate driver;
      a plurality of data lines, each data line being operably connected to a data driver;
      a controller operably connected to the processing unit, the gate drivers, and the data drivers; and
      a dielectric layer covering at least a portion of the transistor matrix, at least a portion of the plurality of gate lines, and at least a portion of the plurality of data lines;
   receiving input instructions in the processing unit, the input instructions relating to a droplet operation to be performed by the AM-EWoD;
   calculating a number of gate blocks in the processing unit, at least one gate block including a plurality of gate lines, wherein the gate lines in at least one block are non-contiguous;
   outputting gate line and data line selecting instructions from the processing unit to the controller, outputting a gate line signal from the controller to the drivers of the at least one gate block, to simultaneously drive the non-contiguous lines of the at least one gate block, and outputting a data line signal from the controller to at least one data line driver, to drive the data line.

2. The method of claim 1, wherein the transistors of the transistor matrix are thin film transistors (TFT).

3. The method of claim 2, wherein the transistors of the transistor matrix comprise a layer of amorphous silicon.

4. The method of claim 2, wherein the transistors of the transistor matrix comprise a layer of a metal oxide semiconductor.

5. The method of claim 2, wherein the transistors of the transistor matrix comprise a layer of low-temperature polycrystalline silicon (LTPS).

6. The method according to claim 1, wherein the droplet operation comprises a plurality of steps, each step comprising driving at least one gate block and at least one data line.

7. The method according to claim 1, wherein the transistor matrix is driven at frequency of at least about 200 Hz.

8. The method according to claim 1, wherein the transistor matrix is driven at frequency of at least about 1 kHz.

9. The method according to claim 1, wherein the maximum line time (MLT) of each gate line is at least about 10 µs.

10. The method according to claim 1, wherein the device further comprises a hydrophobic layer covering at least a portion of the dielectric layer.

11. An active matrix electrowetting on dielectric (AM-EWoD) system, the system comprising:
    a transistor matrix, each transistor of the matrix being operably connected to a gate line, a data line, and a propulsion electrode,
    a plurality of gate lines, each gate line being operably connected to a gate driver;
    a plurality of data lines, each data line being operably connected to a data driver;
    a controller operably connected to the processing unit, the gate drivers, and the data drivers;
    a dielectric layer covering at least a portion of the transistor matrix, at least a portion of the plurality of gate lines, and at least a portion of the plurality of data lines;
    a processing unit operably programmed to perform an adaptive-gate-driving method, the adaptive-gate-driving method comprising:
    receiving input instructions to the processing unit, the input instructions relating to a droplet operation to be performed by the AM-EWoD system;
    calculating a number of gate blocks for performing the droplet operation, at least one gate block including a plurality of non-contiguous gate lines that will simultaneously receive a same gate line signal;
    outputting line selecting instructions from the processing unit to the controller,
    outputting the same gate line signal from the controller to the drivers of the gate block, to simultaneously drive the non-contiguous gate lines of the gate block, and
    outputting a data line signal from the controller to at least one data line driver, to drive the at least one data line.

12. The AM-EWoD system according to claim 11, wherein the transistors of the matrix are thin film transistors (TFT).

13. The AM-EWoD system according to claim 12, wherein the transistors of the transistor matrix comprise a layer of amorphous silicon.

14. The AM-EWoD system according to claim 12, wherein the transistors of the transistor matrix comprise a layer of a metal oxide semiconductor.

15. The AM-EWoD system according to claim 12, wherein the transistors of the transistor matrix comprise a layer of low-temperature polycrystalline silicon (LTPS).

16. The AM-EWoD system according to claim 11, wherein the transistor matrix is driven at frequency of at least about 200 Hz.

17. The AM-EWoD system according to claim 11, wherein the transistor matrix is driven at frequency of at least about 1 kHz.

18. The AM-EWoD system according to claim 11, wherein the maximum line time (MLT) of each gate line is at least about 10 µs.

19. The AM-EWoD system according to claim 11, wherein the device further comprises a hydrophobic layer covering at least a portion of the dielectric layer.

* * * * *